United States Patent
Yamada

(10) Patent No.: US 9,614,402 B2
(45) Date of Patent: Apr. 4, 2017

(54) POWER TRANSMISSION APPARATUS, POWER RECEPTION APPARATUS, WIRELESS POWER FEEDING SYSTEM, AND CONTROL METHOD THEREOF

(71) Applicant: CANON KABUSHIKI KAISHA, Tokyo (JP)

(72) Inventor: Ryohei Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 14/231,424

(22) Filed: Mar. 31, 2014

(65) Prior Publication Data
US 2014/0292096 A1 Oct. 2, 2014

(30) Foreign Application Priority Data
Apr. 2, 2013 (JP) .................. 2013-076983

(51) Int. Cl.
 *H02J 17/00* (2006.01)
(52) U.S. Cl.
 CPC .................. *H02J 17/00* (2013.01)
(58) Field of Classification Search
None
See application file for complete search history.

(56) References Cited

U.S. PATENT DOCUMENTS

| | | | | |
|---|---|---|---|---|
| 2013/0249305 A1* | 9/2013 | Kudo | .............. | H02J 17/00 307/104 |
| 2013/0307468 A1* | 11/2013 | Lee | .............. | H02J 7/0052 320/108 |
| 2014/0111153 A1* | 4/2014 | Kwon | .............. | H02J 7/025 320/108 |

(Continued)

FOREIGN PATENT DOCUMENTS

| | | |
|---|---|---|
| JP | 2005513563 A | 5/2005 |
| JP | 2009136132 A | 6/2009 |

(Continued)

*Primary Examiner* — Rexford Barnie
*Assistant Examiner* — Swarna N Chowdhuri
(74) *Attorney, Agent, or Firm* — Canon U.S.A., Inc. IP Division

(57) ABSTRACT

There is provided a power transmission apparatus capable of selecting a power transmission apparatus for power feeding easily from among a plurality of power transmission apparatuses. A power transmission apparatus configured to feed power wirelessly to a power reception apparatus includes a communication unit configured to communicate with another power transmission apparatus configured to feed power wirelessly to the power reception apparatus, an acquisition unit configured to acquire individual information about the power transmission apparatus and individual information about the another power transmission apparatus via the communication unit, a transmission unit configured to transmit the individual information about the power transmission apparatus and the individual information about the another power transmission apparatus acquired by the acquisition unit to the power reception apparatus, and a power feeding unit configured to feed power to the power reception apparatus in response to a power feeding request from the power reception apparatus.

4 Claims, 21 Drawing Sheets

(56) References Cited

U.S. PATENT DOCUMENTS

| | | | | |
|---|---|---|---|---|
| 2014/0191819 A1* | 7/2014 | Suzuki | .................... | H03H 7/40 333/17.3 |
| 2015/0061401 A1* | 3/2015 | Nago | ..................... | H02J 5/005 307/104 |

FOREIGN PATENT DOCUMENTS

| | | |
|---|---|---|
| JP | 05116904 A | 1/2013 |
| JP | 2013-247796 A | 12/2013 |
| WO | 2011/063053 A2 | 5/2011 |

* cited by examiner

POWER TRANSMISSION APPARATUS, POWER RECEPTION APPARATUS, WIRELESS POWER FEEDING SYSTEM, AND CONTROL METHOD THEREOF

BACKGROUND OF THE INVENTION

Field of the Invention

The present invention relates to a power transmission apparatus, a power reception apparatus, a wireless power feeding system, a control method.

Description of the Related Art

The following four methods are used for supplying power in a non-contact manner (wirelessly): an electromagnetic induction method, a magnetic resonance method, an electric field coupling method, and a radio wave reception method. In recent years, among these four methods, the magnetic resonance method has drawn attention. With this method, sufficient power can be transmitted and a long power transmission distance can be ensured. For example, as such magnetic resonance method, by utilizing this power transmission distance, Japanese Patent Application Laid-Open No. 2009-136132 discusses a 1-to-N power feeding method for allowing a power transmission apparatus to transmit power to a plurality of wireless power reception apparatuses.

According to Japanese Patent Application Laid-Open No. 2009-136132, in a standby mode in which the power transmission apparatus is not feeding power, the power transmission apparatus transmits certain pulse signals to determine whether any wireless power reception apparatus has come close within a few meters of the power transmission apparatus. If a wireless power reception apparatus transmits its own unique identification data (ID) to the power transmission apparatus, the power transmission apparatus determines whether this wireless power reception apparatus is a wireless power reception apparatus as a target for power feeding. If the wireless power reception apparatus is determined to be a target, the power transmission apparatus feeds power to the wireless power reception apparatus. In this operation, the power transmission apparatus can transmit unique codes to the wireless power reception apparatus so that the wireless power reception apparatus can receive respective data such as a charge amount and a device status from the power transmission apparatus.

However, different power reception apparatuses have different specifications. For example, as discussed in Japanese Unexamined Patent Application Publication (Translation of PCT Application) No. 2005-513563, a plasma display panel (PDP) requires accurate voltage levels from a power feeding device for addressing and sustain voltages used for display. To adjust an output voltage from the power feeding device, a load device, a control signal setting unit, and a control unit are added to a device for performing power feeding. The load device has the control signal setting unit for outputting a control signal in response to an output parameter value supplied from the power feeding device. The power feeding device has a control unit for receiving the control signal. The power feeding device controls the output voltage by performing feedback through these added units and devices.

SUMMARY OF THE INVENTION

However, in the systems discussed in Japanese Patent Application Laid-Open No. 2009-136132 and Japanese Unexamined Patent Application Publication (Translation of PCT Application) No. 2005-513563, if a power reception apparatus is located in an area where the power feeding areas of a plurality of power transmission apparatuses overlap, the power reception apparatus cannot check power feeding statuses of the plurality of power transmission apparatuses. Thus, since the power reception apparatus cannot select one of the plurality of power transmission apparatuses for power feeding, the above systems provide poor convenience, causing a problem.

The present invention is directed to a power transmission apparatus, a power reception apparatus, and a wireless power feeding system enabling a user to easily select one of a plurality of power transmission apparatuses for power feeding.

According to an aspect of the present invention, a power transmission apparatus configured to feed power wirelessly to a power reception apparatus, includes a communication unit configured to communicate with another power transmission apparatus configured to feed power wirelessly to the power reception apparatus, an acquisition unit configured to acquire individual information about the power transmission apparatus and individual information about the another power transmission apparatus via the communication unit, a transmission unit configured to transmit the individual information about the power transmission apparatus and the individual information about the another power transmission apparatus acquired by the acquisition unit to the power reception apparatus, and a power feeding unit configured to feed power to the power reception apparatus in response to a power feeding request from the power reception apparatus.

Further features of the present invention will become apparent from the following description of exemplary embodiments with reference to the attached drawings.

DESCRIPTION OF THE EMBODIMENTS

Figure 1:
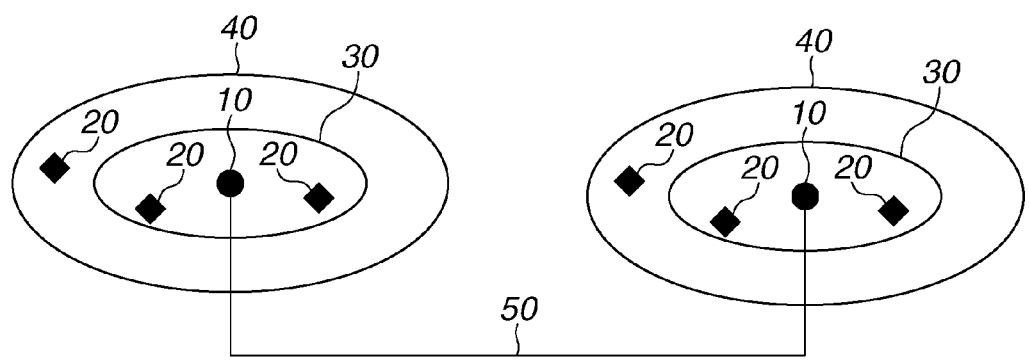
FIG. 1 is a conceptual diagram illustrating a configuration of a wireless power feeding system.

Hereinafter, exemplary embodiments according to the present invention will be described with reference to the drawings. FIG. 1 is a conceptual diagram illustrating a configuration of a wireless power feeding system according to a first exemplary embodiment.

Each power transmission apparatus 10 can wirelessly transmit power to relevant power reception apparatuses 20. Each power transmission apparatus 10 can exchange data necessary for power feeding with relevant power reception apparatuses 20.

Each power reception apparatus 20 can wirelessly receive power from relevant power transmission apparatuses 10. In addition, each power reception apparatus 20 can exchange data necessary for power feeding with relevant power transmission apparatuses 10.

Each power transmission apparatus 10 has a power feeding area 30 in which the power transmission apparatus 10 can feed power to relevant power reception apparatuses 20.

Each power transmission apparatus 10 has a communication areas 40 in which the power transmission apparatus 10 can perform data communication with relevant power transmission apparatuses 10 and power reception apparatuses 20. The communication areas 40 are larger than the respective power feeding areas 30 and encompass the respective power feeding areas 30.

In addition, as illustrated in FIG. 1, if a plurality of power reception apparatuses 20 exists in the power feeding area 30 of a power transmission apparatus 10, the power transmission apparatus 10 can wirelessly feed power to these power reception apparatuses 20 simultaneously. In addition, the power transmission apparatuses 10 can communicate with other power transmission apparatuses 10. In such cases, communication paths are established on a network 50. A local area network (LAN) is used as the network 50.

<Configuration of Power Transmission Apparatus>

Figure 2:
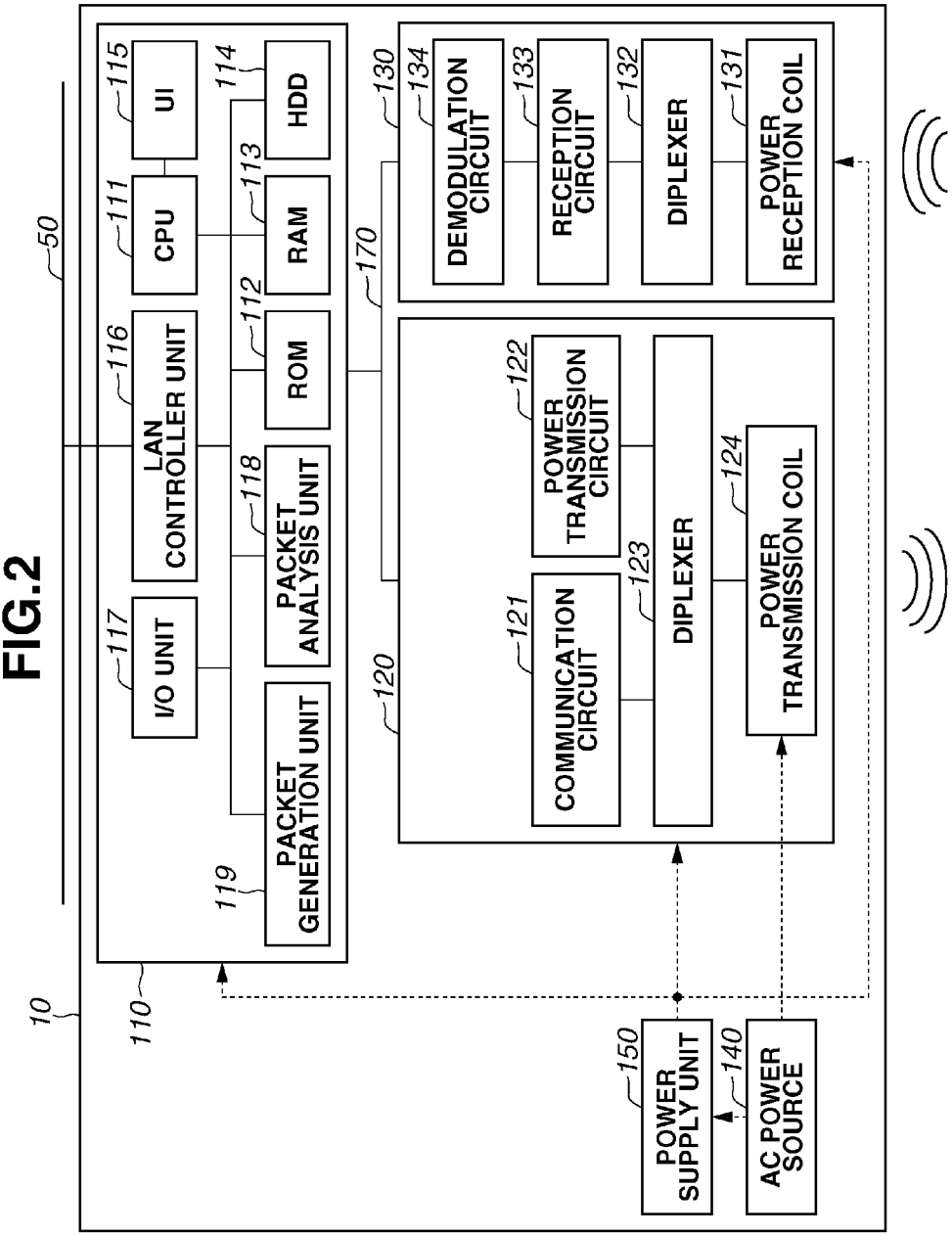
FIG. 2 is a block diagram illustrating a configuration of a power transmission apparatus according to a first exemplary embodiment.

FIG. 2 is a block diagram illustrating a configuration of a power transmission apparatus. In FIG. 2, solid lines represent data exchange lines and dotted lines represent power supply lines.

The power transmission apparatus 10 includes a control unit 110, a wireless transmission unit 120, a wireless reception unit 130, an alternating-current (AC) power source 140, and a power supply unit 150.

The control unit 110 collectively controls the power transmission apparatus 10. The control unit 110 includes a central process unit (CPU) 111, a read-only memory (ROM) 112, a random access memory (RAM) 113, a hard disk drive (HDD) 114, a user interface (UI) 115, a LAN controller unit 116, an input/output (I/O) unit 117, a packet analysis unit 118, and a packet generation unit 119. In addition, the control unit 110 is connected to the wireless transmission unit 120 and the wireless reception unit 130 via an internal bus 170.

The CPU 111 processes various kinds of data to control the power transmission apparatus 10.

The ROM 112 is a nonvolatile storage medium and stores a boot program and the like to be used by the CPU 111.

The RAM 113 is a volatile storage medium and temporarily stores data, programs, and the like to be used by the CPU 111.

The HDD 114 is a nonvolatile storage medium and stores an operating system (OS), applications, and the like to be used by the CPU 111.

The UI 115 displays various types of information to a user and receives various instructions from the user.

The LAN controller unit 116 communicates with other power transmission apparatuses 10.

The I/O unit 117 transmits and receives data such as packets.

The packet analysis unit 118 analyzes packets received via the I/O unit 117.

The packet generation unit 119 generates packets.

The wireless transmission unit 120 wirelessly feeds power to power reception apparatuses 20. The wireless transmission unit 120 includes a communication circuit 121, a power transmission circuit 122, a diplexer 123, and a power transmission coil 124.

The communication circuit 121 generates a modulated signal for performing communication.

The power transmission circuit 122 generates a modulated signal for transmitting power.

The diplexer 123 synthesizes the modulated signals generated by the communication circuit 121 and the power transmission circuit 122.

The power transmission coil 124 transmits the modulated signal synthesized by the diplexer 123 to power reception apparatuses 20.

The wireless reception unit 130 receives data from power reception apparatuses 20. The wireless reception unit 130 includes a power reception coil 131, a diplexer 123, a reception circuit 133, and a demodulation circuit 134.

The power reception coil 131 receives a modulated signal for performing communication from power reception apparatuses 20.

The diplexer 123 separates the modulated signal into a modulated signal of a communication data frequency and a modulated signal of a power frequency. In addition, the diplexer 123 transmits the modulated signal of communication data to the reception circuit 133. The reception circuit 133 receives the communication data, and the demodulation circuit 134 demodulates the communication data.

The AC power source 140 supplies an AC voltage to the power transmission coil 124 and the power supply unit 150.

The power supply unit 150 converts the AC voltage supplied from the AC power source 140 into a direct-current (DC) voltage and supplies the DC voltage to the control unit 110, the wireless transmission unit 120, and the wireless reception unit 130.

The HDD 114 of the power transmission apparatus 10 stores a power feeding usage rate representing a relationship between a power amount that can be fed to power reception apparatuses 20 and a power amount that is being fed, area information about the power transmission apparatus 10, and current position information about the power transmission apparatus 10. Since the power feeding usage rate is a ratio between a power amount that can be fed and a power amount that is being fed, this rate changes depending on the amount of power that the power transmission apparatus 10 is feeding to power reception apparatuses 20. A power feeding limit value, i.e., a threshold, can previously be set in the power transmission apparatus 10. As a matter of course, the threshold can be set via the UI 115. This process for setting the threshold corresponds to an example of a process performed by a setting unit. The area information includes the power feeding area 30 and the communication area 40 of the power transmission apparatus 10. The current position information may previously be set or may be set via the UI 115.

<Configuration of Power Reception Apparatus>

Figure 3:
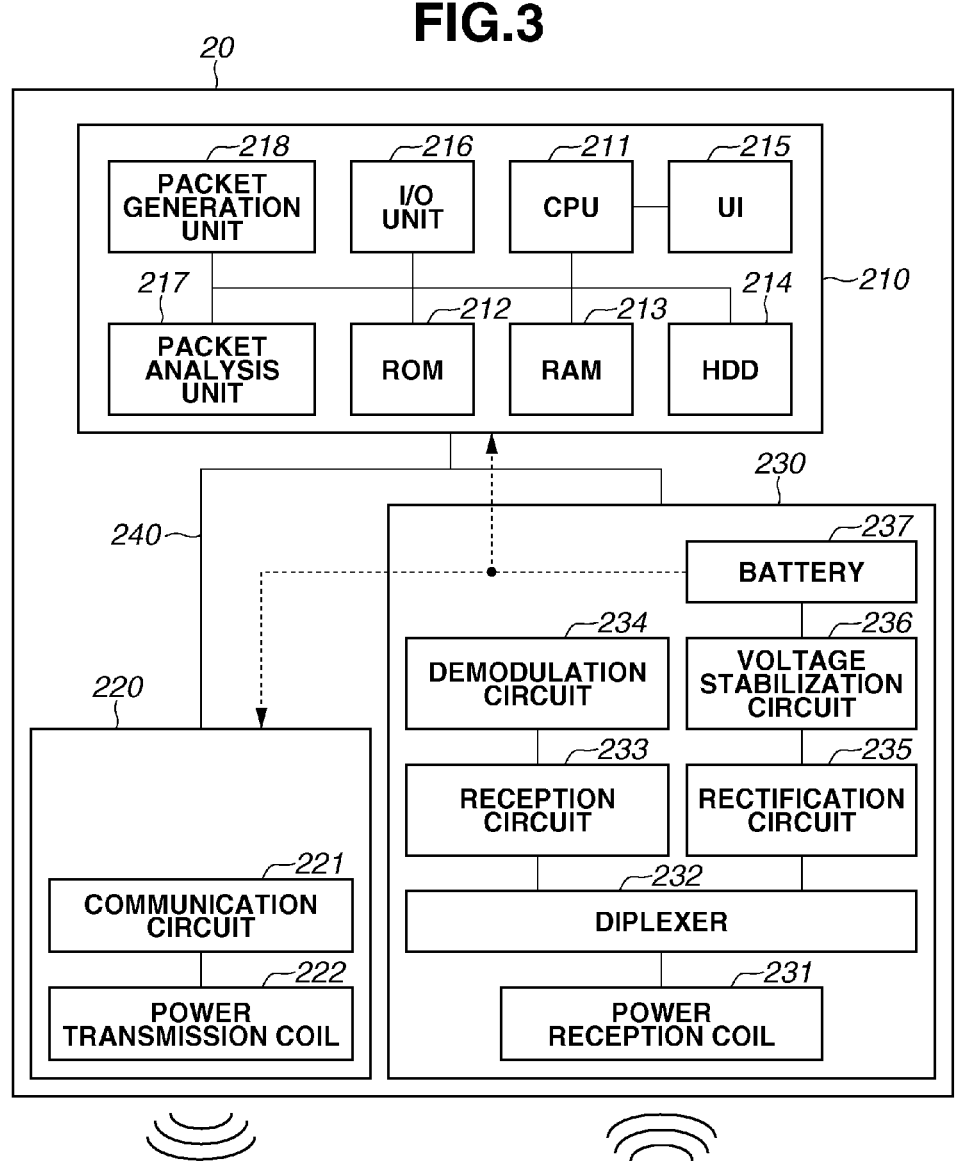
FIG. 3 is a block diagram illustrating a configuration of a power reception apparatus.

FIG. 3 is a block diagram illustrating a configuration of a power reception apparatus. In FIG. 3, solid lines represent data exchange lines and dotted lines represent power supply lines. The present exemplary embodiment will be described assuming that the power reception apparatus can be taken along by a user, for example.

The power reception apparatus 20 includes a control unit 210, a wireless transmission unit 220, and a wireless reception unit 230. The control unit 210 collectively controls the power reception apparatus 20. The control unit 210 includes a CPU 211, a ROM 212, a RAM 213, an HDD 214, a UI 215, an I/O unit 216, a packet analysis unit 217, and a packet generation unit 218. In addition, the control unit 210 is connected to the wireless transmission unit 220 and the wireless reception unit 230 via an internal bus 240.

The CPU 211 processes various data to control the power reception apparatus 20.

The ROM 212 is a nonvolatile storage medium and stores a boot program and the like to be used by the CPU 211.

The RAM 213 is a volatile storage medium and temporarily stores data, programs, and the like to be used by the CPU 211.

The HDD 214 is a nonvolatile storage medium and stores an OS, applications, and the like to be used by the CPU 211.

The UI 215 includes a display unit displaying various information to a user and an operation unit receiving various instructions from the user.

The I/O unit 216 transmits and receives data such as packets.

The packet analysis unit 217 analyzes packets received via the I/O unit 216.

The packet generation unit 218 generates packets.

The wireless transmission unit 220 transmits data to power transmission apparatuses 10. The wireless transmission unit 220 includes a communication circuit 221 and a power transmission coil 222.

The communication circuit 221 generates a modulated signal for performing communication.

The power transmission coil 222 transmits the modulated signal generated by the communication circuit 221 to power transmission apparatuses 10.

The wireless reception unit 230 wirelessly receives power from power transmission apparatuses 10. The wireless reception unit 230 includes a power reception coil 231, a diplexer 232, a reception circuit 233, a demodulation circuit 234, a rectification circuit 235, a voltage stabilization circuit 236, and a battery 237.

The power reception coil 231 receives a modulated signal from power transmission apparatuses 10.

The diplexer 232 separate the modulated signal received by the power reception coil 231 into a modulated signal for performing communication and a modulated signal for transmitting power.

The reception circuit 233 receives the modulated signal for performing communication obtained by the separation performed by the diplexer 232.

The demodulation circuit 234 demodulates the modulated signal received by the reception circuit 233.

The rectification circuit 235 rectifies the modulated signal for transmitting power obtained by the division performed by the diplexer 232 and generates a DC voltage.

The voltage stabilization circuit 236 stabilizes the DC voltage generated by the rectification circuit 235.

The battery 237 receives the voltage stabilized by the voltage stabilization circuit 236 and accumulates power. In addition, based on the accumulated power, the battery 237 supplies the DC voltage to the control unit 210, the wireless transmission unit 220, and the wireless reception unit 230.

Figure 4:
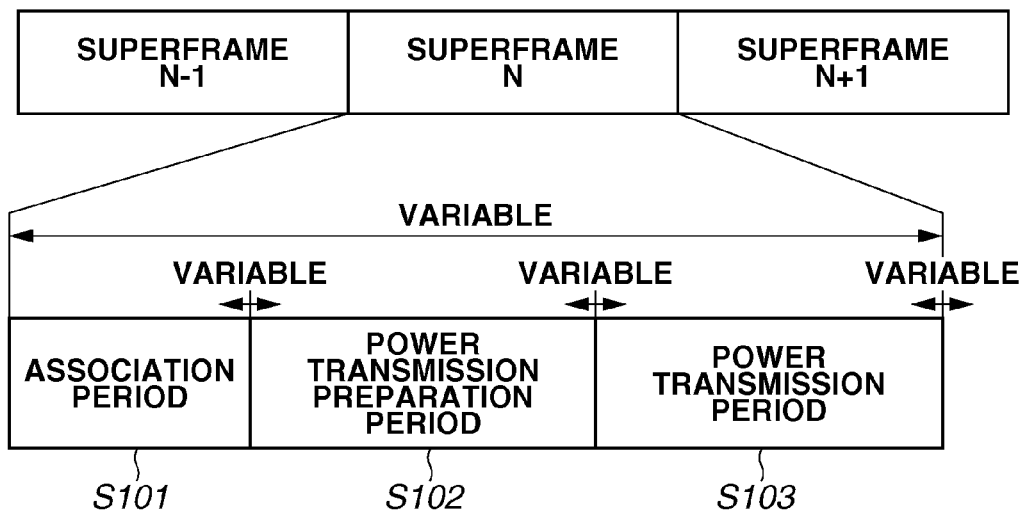
FIG. 4 illustrates a configuration of a superframe.

FIG. 4 illustrates a configuration of a superframe.

The superframe is repeated to realize wireless power feeding in the above wireless power feeding system. A single superframe includes step S101 (association period), step S102 (power transmission preparation period), and step S103 (power transmission period). Each of the periods is variable.

In step S101, the power transmission apparatus 10 checks a device ID and necessity of power to a power reception apparatus 20. If a device ID and necessity of power is confirmed, the operation proceeds to step S102. The time period during which the operation proceeds from step S101 to step S102 is also variable.

Next, in step S102, the power reception apparatus can transmit a "response" or an "acknowledge" in response to the data request frame from the power transmission apparatus 10. The lengths of the response and acknowledge frames are variable. After step S102, the operation proceeds to step S103. When the operation proceeds from step S102 to step S103 is also variable.

Next, in step S103, the power transmission apparatus 10 transmits power to the power reception apparatus 20. In step S103, without a request frame from the power transmission apparatus 10, the power reception apparatus 20 can transmit a frame to the power transmission apparatus 10.

Figure 5:
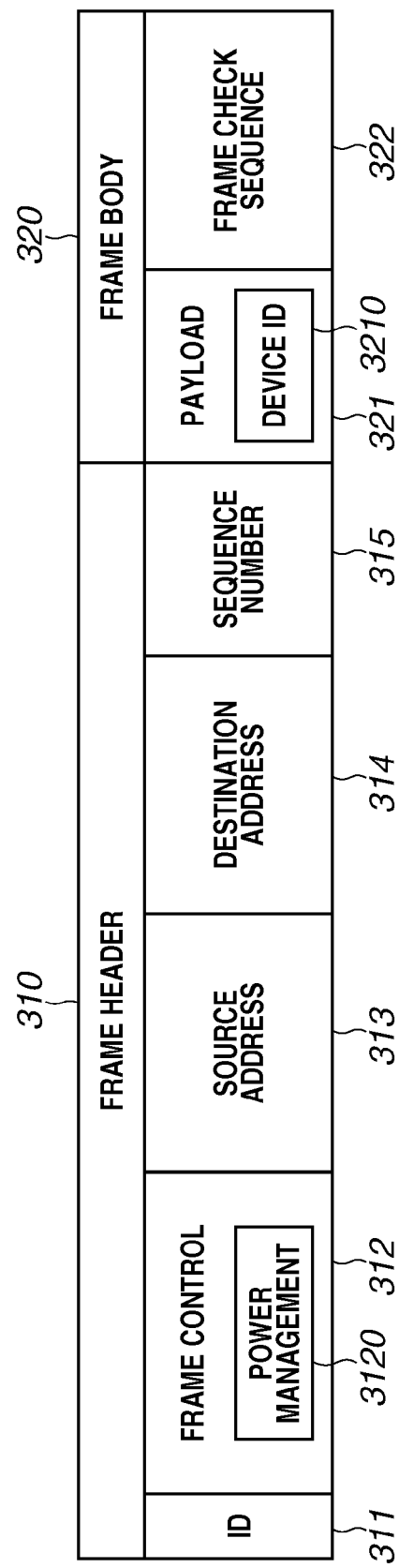
FIG. 5 illustrates a configuration of a frame format.

FIG. 5 illustrates a configuration of a frame format.

In the above-described superframe, packets in the frame format as illustrated in FIG. 5 are used to realize data communication for wireless power feeding.

A frame header 310 represents information such as a destination to which data is transferred. The frame header 310 includes an ID 311, a frame control 312, a source address 313, a destination address 314, and a sequence number 315.

The ID 311 is used when data communication is performed in the wireless power feeding system.

The frame control 312 represents information for performing data exchange with power reception apparatuses 20. The frame control 312 includes a power management 3120. The power management 3120 represents data for checking necessity of power.

The source address 313 is a source address from which data is transferred.

The destination address 314 is a destination address to which data is transferred.

The sequence number 315 is a frame number.

A frame body 320 represents information including data body to be transferred. The frame body 320 includes a payload 321 and a frame check sequence 322.

The payload 321 represents data body. For example, a device ID 3210 is allocated to the payload 321.

The frame check sequence 322 represents data for performing error check on the payload 321.

Figure 6:
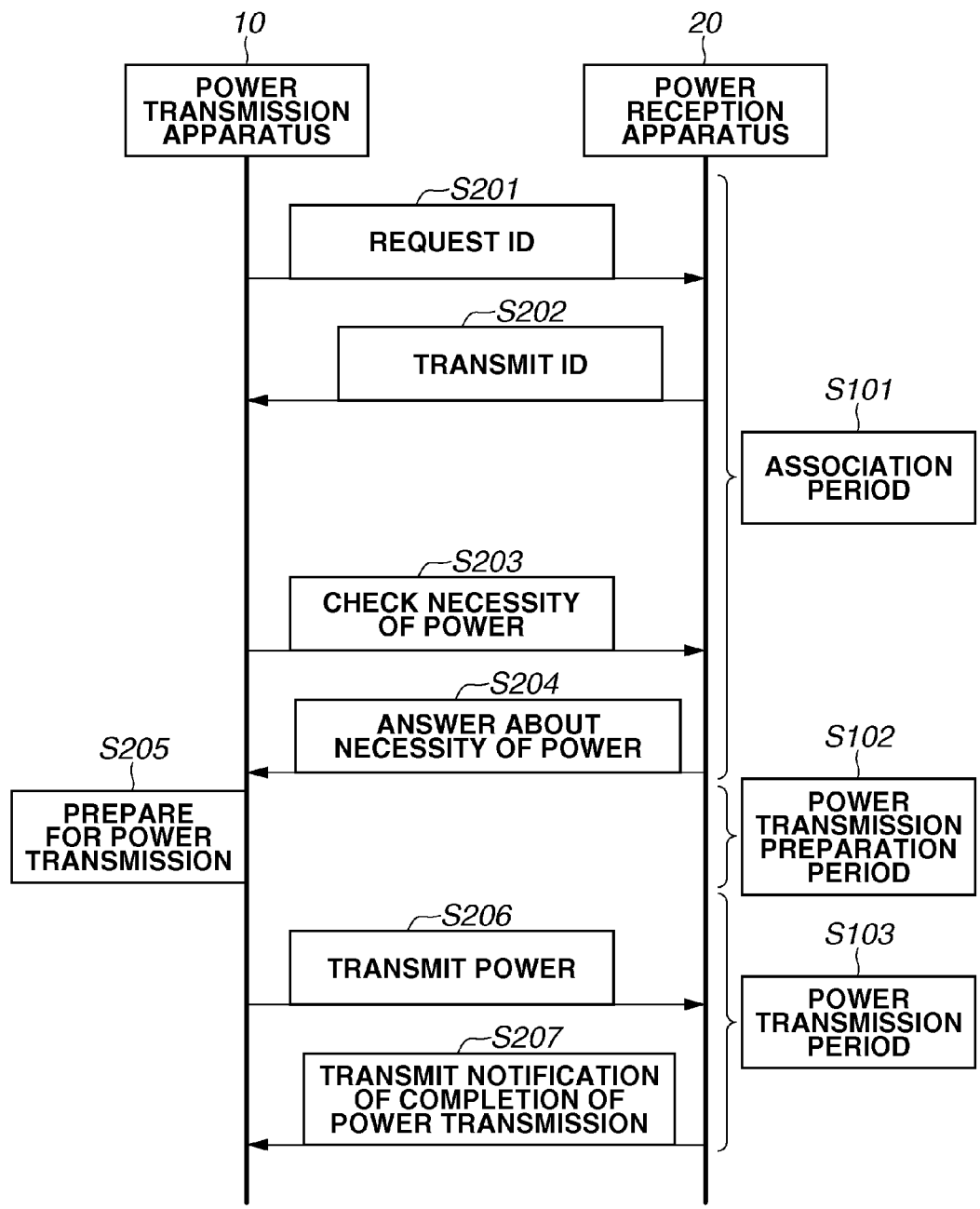
FIG. 6 is a sequence diagram illustrating data exchange.

FIG. 6 is a sequence diagram illustrating data exchange between a power transmission apparatus and a power reception apparatus by using superframes. Data communication for wireless power feeding can be realized by performing processing illustrated in FIG. 6 within the above superframes.

First, in step S201, the power transmission apparatus 10 requests the power reception apparatus 20 to transmit a device ID. In the step S201, the power transmission apparatus 10 uses the ID 311 in the frame format.

Next, in step S202, the power transmission apparatus 10 receives the device ID 3210 from the power reception apparatus 20. At that time, the power reception apparatus 20 uses the ID 311 in the frame format.

Next, in step S203, the power transmission apparatus 10 checks necessity of power to the power reception apparatus 20. At that time, the power transmission apparatus 10 uses the power management 3120 in the frame format.

Next, in step S204, the power reception apparatus 20 notifies the power transmission apparatus 10 of necessity of power if the power reception apparatus 20 needs power. In step S204, the power reception apparatus 20 notifies the power transmission apparatus 10 that the power reception apparatus 20 does not need power if the power reception apparatus 20 does not need power. At that time, the power reception apparatus 20 uses the power management 3120 in the frame format.

Next, in step S205, the power transmission apparatus 10 prepares for power transmission.

Next, in step S206, the power transmission apparatus 10 transmits power to the power reception apparatus 20.

Next, in step S207, the power reception apparatus 20 notifies the power transmission apparatus 10 of completion of power transmission when the battery is fully charged. In this step, the power reception apparatus 20 uses the power management 3120 in the frame format.

Figure 7:
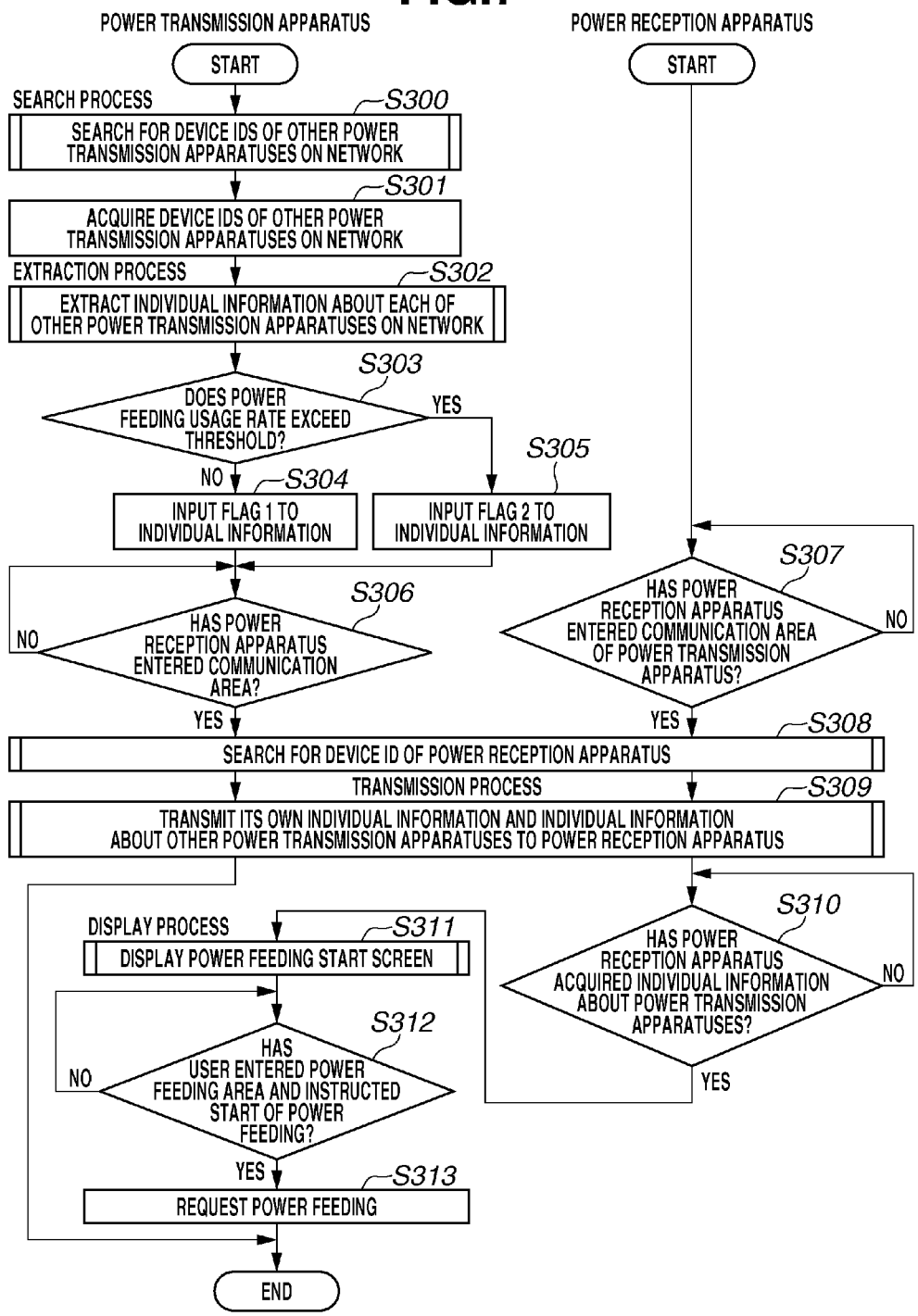
FIG. 7 is a flowchart illustrating a process in the wireless power feeding system according to the first exemplary embodiment.

Next, a process in which a power transmission apparatus 10 feeds power to a power reception apparatus 20 in the wireless power feeding system according to the first exemplary embodiment will be described with reference to a flowchart in FIG. 7.

First, in step S300, the CPU 111 of the control unit 110 of the power transmission apparatus 10 searches for device IDs of other power transmission apparatuses 10 through the network 50 at an arbitrary timing (search process). The power transmission apparatus 10 may search for the device IDs in accordance with a setting set in the HDD 114, the ROM 112, the RAM 113, or the UI 115 of the power transmission apparatus 10. The power transmission apparatus 10 performs this search process in steps S201 and S202 of the device ID exchange in step S101 of the association period illustrated in FIG. 6 in which the power transmission apparatus 10 communicates with the other power transmission apparatuses 10.

Figure 8:
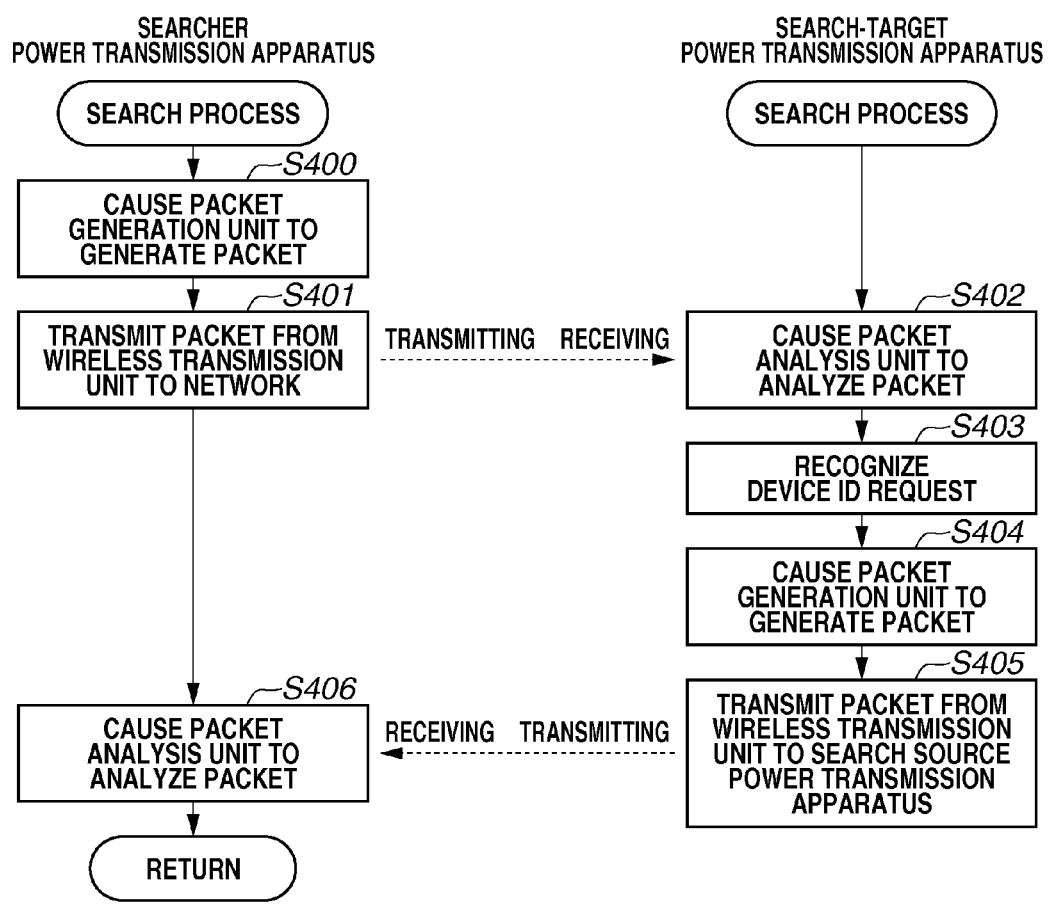
FIG. 8 is a flowchart illustrating a search process.

Next, the search process performed in step S300 will be described with reference to a flowchart in FIG. 8.

In step S400, the CPU 111 of the control unit 110 of the power transmission apparatus 10 causes the packet generation unit 119 to generate a packet for searching for a device ID at an arbitrary timing. The packet generated by the packet generation unit 119 is formed by the frame header 310 and the frame body 320 illustrated in FIG. 5. More specifically, the packet generation unit 119 inputs a device ID request in the frame control 312 in the frame header 310. In addition, the packet generation unit 119 inputs an address of the search source power transmission apparatus 10 and an address of the search-target power transmission apparatus 10 in the source address 313 and the destination address 314, respectively.

In step S401, the CPU 111 of the control unit 110 of the power transmission apparatus 10 transmits the generated packet from the I/O unit 117 to the wireless transmission unit 120 via the internal bus 170. The communication circuit 121 generates a modulated signal for performing communication, and the power transmission circuit 122 generates a modulated signal for transmitting power. Next, the diplexer 123 synthesizes the modulated signals generated by the communication circuit 121 and the power transmission circuit 122, and modulates a packet for searching for a device ID. The power transmission coil 124 transmits the modulated packet to the other power transmission apparatus 10 on the network 50.

In step S402, the CPU 111 of the control unit 110 of the other power transmission apparatus 10 causes the power reception coil 131 of the wireless reception unit 130 to receive the modulated packet, and causes the wireless reception unit 130 to transmit the packet to the control unit 110 via the internal bus 170. The other power transmission apparatus 10 receives the packet in the device ID exchange (steps S201 and S202) in the association period (step S101) illustrated in FIG. 6. The CPU 111 of the control unit 110 of the other transmission apparatus 10 causes the packet analysis unit 118 to analyze the received packet.

In step S403, based on the analysis result obtained by the packet analysis unit 118, the CPU 111 of the control unit 110 of the other transmission apparatus 10 recognizes the device ID request.

In step S404, the CPU 111 of the control unit 110 of the other power transmission apparatus 10 causes the packet generation unit 119 to generate a packet including device ID information stored in the HDD 114. The packet generated by the packet generation unit 119 in step S404 is formed by the frame header 310 and the frame body 320 as illustrated in FIG. 5. More specifically, device ID provision is input in the frame control 312 in the frame header 310. In addition, the packet generation unit 119 inputs an address of the search-target power transmission apparatus 10 and an address of the search source power transmission apparatus 10 in the source address 313 and the destination address 314, respectively. The packet generation unit 119 inputs the device ID of the search-target power transmission apparatus 10 in the payload 321 in the frame body 320.

In step S405, the CPU 111 of the control unit 110 of the other power transmission apparatus 10 transmits the generated packet from the I/O unit 117 to the wireless transmission unit 120 via the internal bus 170. The wireless transmission unit 120 transmits the packet to the search source power transmission apparatus 10. Since this step is similar to step S401, redundant description thereof will be avoided.

Next, in step S406, the CPU 111 of the control unit 110 of the power transmission apparatus 10 receives the packet and causes the packet analysis unit 118 to analyze the packet. Since this step is similar to step S402, redundant description thereof will be avoided.

Referring back to FIG. 7, in step S301, the CPU 111 of the control unit 110 of the power transmission apparatus 10 acquires the device IDs of the other power transmission apparatuses 10, based on the packet analysis results obtained by the packet analysis unit 118. The CPU 111 of the control unit 110 of the power transmission apparatus 10 stores the acquired device IDs of the other power transmission apparatuses 10 in the HDD 114.

In step S302, the CPU 111 of the control unit 110 of the power transmission apparatus 10 extracts individual information about each of the other power transmission apparatuses 10 that have been searched (extraction process). The individual information includes the power feeding usage rate, the area information, and the current position information.

Figure 9:
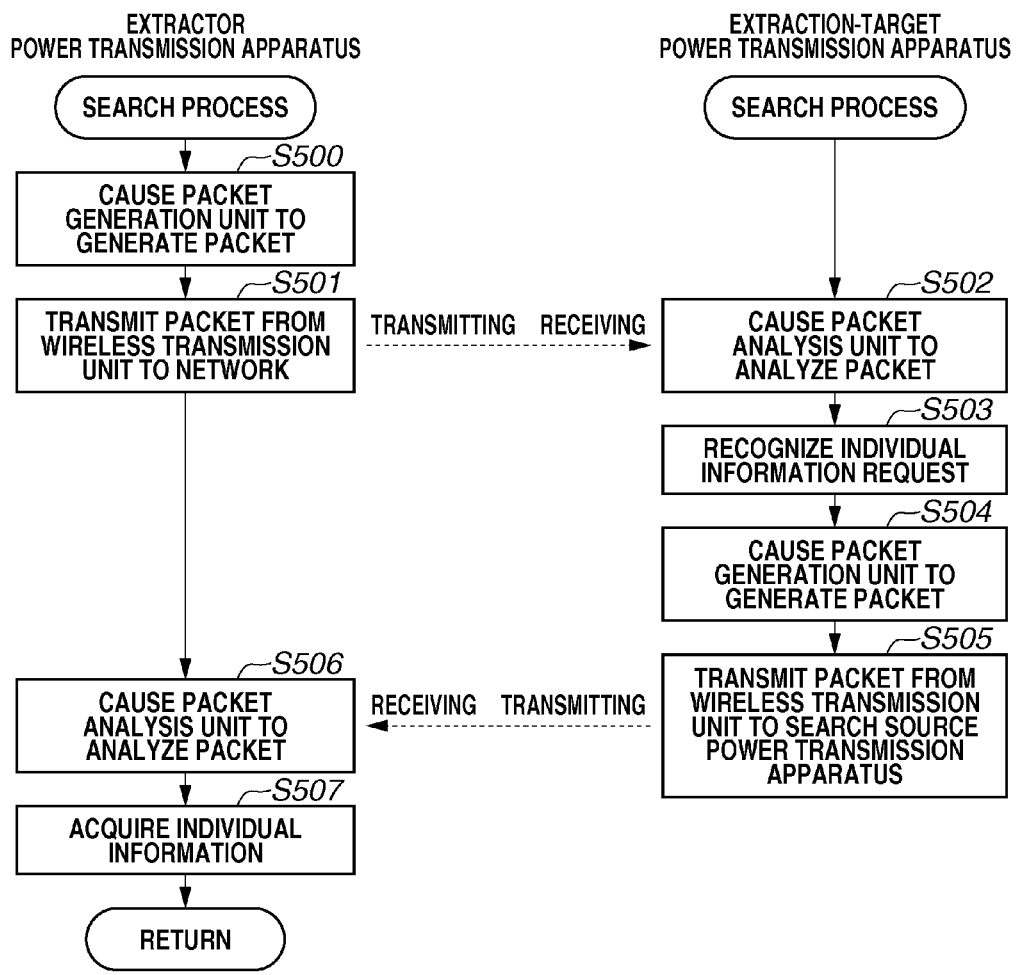
FIG. 9 is a flowchart illustrating an extraction process.

Next, the extraction process performed in step S302 will be described with reference to a flowchart in FIG. 9.

First, in step S500, the CPU 111 of the control unit 110 of the power transmission apparatus 10 causes the packet generation unit 119 to generate a packet for extracting individual information. At that time, when generating the packet, the packet generation unit 119 inputs an individual information request in the frame control 312 in the frame header 310. In addition, the packet generation unit 119 inputs an address of the search source power transmission apparatus 10 and an address of the power transmission apparatus 10 having a device ID of a search target in the source address 313 and the destination address 314, respectively.

Next, in step S501, the CPU 111 of the control unit 110 of the power transmission apparatus 10 transmits the generated packet to the search-target power transmission apparatus 10 via the network 50. Since this step is similar to step S401, redundant description thereof will be avoided.

Next, in step S502, the CPU 111 of the control unit 110 of the search-target power transmission apparatus causes the packet analysis unit 118 to analyze the received packet. Since this step is similar to step S402, redundant description thereof will be avoided.

Next, in step S503, the CPU 111 of the control unit 110 of the search-target power transmission apparatus 10 recognizes the individual information request, based on the analysis result obtained by the packet analysis unit 118.

Next, in step S504, the CPU 111 of the control unit 110 of the search-target power transmission apparatus 10 causes the packet generation unit 119 to generate a packet including individual information stored in the HDD 114. In this step, when generating the packet, the packet generation unit 119 inputs information about individual information provision in the frame control 312 in the frame header 310. In addition, the packet generation unit 119 inputs an address of the power transmission apparatus 10 having a search-target device ID and an address of the search source power transmission apparatus 10 in the source address 313 and the destination address 314, respectively. In addition, the packet generation unit 119 inputs the individual information about the power transmission apparatus 10 having the search-target device ID in the payload 321 in the frame body 320.

Next, in step S505, the CPU 111 of the control unit 110 of the search-target power transmission apparatus 10 transmits the generated packet to the search source power transmission apparatus 10. Since this step is similar to step S401, redundant description thereof will be avoided.

Next in step S506, the CPU 111 of the control unit 110 of the search source power transmission apparatus 10 receives the packet and causes the packet analysis unit 118 to analyze the packet. Since this step is similar to step S402, redundant description thereof will be avoided.

Next, in step S507, based on the packet analysis result obtained by the packet analysis unit 118, the CPU 111 of the control unit 110 of the search source power transmission apparatus 10 acquires the individual information about the power transmission apparatus 10 having the search-target device ID, and extracts the individual information. The CPU 111 of the control unit 110 of the search source power transmission apparatus 10 stores the extracted individual information about the power transmission apparatus 10 in the HDD 114.

Referring back to FIG. 7, in step S303, the CPU 111 of the control unit 110 of the power transmission apparatus 10 compares the power feeding usage rates included in the acquired individual information with a set threshold and determines whether there is a power feeding usage rate exceeding the threshold. This process corresponds to an example of a process performed by a determination unit that determines whether power feeding to the power reception apparatus 20 is possible. If a power feeding usage rate does not exceed the threshold (NO in step S303), the operation proceeds to step S304. In step S304, the power transmission apparatus 10 inputs flag 1 in the corresponding individual information. On the other hand, if a power feeding usage rate exceeds the threshold (YES in step S303), the operation proceeds to step S305. In step S305, the power transmission apparatus 10 inputs flag 2 in the corresponding individual information. Each of flag 1 and flag 2 represents a result of the determination of whether power feeding is possible or not.

In the same way, the power transmission apparatus 10 also performs the determination by using the power feeding usage rate included in its own individual information. More specifically, the CPU 111 of the control unit 110 of the power transmission apparatus 10 acquires its own individual information stored in the HDD 114, determines whether the power feeding usage rate included in the acquired individual information exceeds the threshold, and inputs flag 1 or flag 2 in the individual information.

In step S306, the power transmission apparatus 10 determines whether the power reception apparatus 20 has entered the communication area 40. If the power transmission apparatus 10 determines that the power reception apparatus 20 has entered the communication area 40 (YES in step S306), the operation proceeds to step S308. Similarly, in step S307, the power reception apparatus 20 determines whether the power reception apparatus 20 has entered the communication area 40 of the power transmission apparatus 10. If the reception apparatus 20 determines the power reception apparatus 20 has entered the communication area 40 of the power transmission apparatus 10 (YES in step S307), the operation proceeds to step S308. If the power reception apparatus 20 has entered the communication area 40, the power transmission apparatus 10 and the power reception apparatus 20 perform communication in steps S201 and S202 of the exchange of the device ID 3210 in the association period (step S101) illustrated in FIG. 6.

Next, in step S308, the power transmission apparatus 10 searches for a device ID of the power reception apparatus 20 that has entered the communication area 40 (search process).

Figure 10:
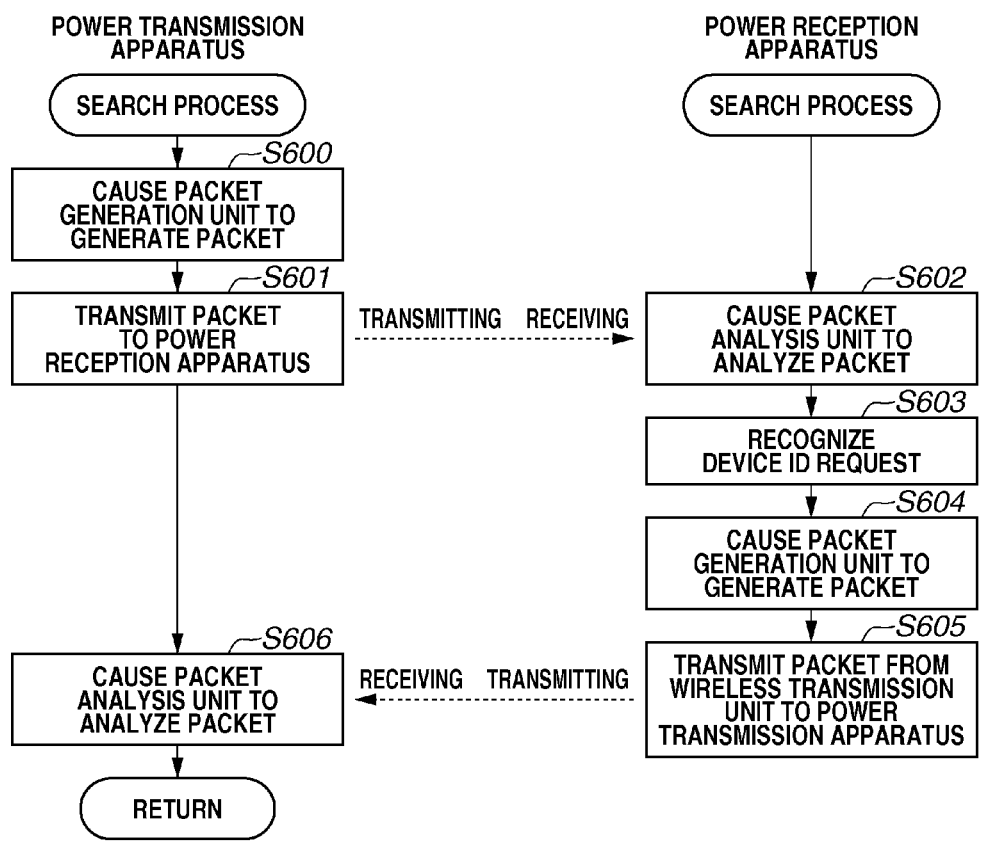
FIG. 10 is a flowchart illustrating a search process.

Next, the search process in step S308 will be described with reference to a flowchart in FIG. 10.

First, in step S600, the CPU 111 of the control unit 110 of the power transmission apparatus 10 causes the packet generation unit 119 to generate a packet for searching for the device ID. In this step, when generating the packet, the packet generation unit 119 inputs a device ID request in the frame control 312 in the frame header 310. In addition, the packet generation unit 119 inputs an address of the power transmission apparatus 10 and an address of the power reception apparatus 20 in the source address 313 and the destination address 314, respectively.

Next, after the packet generated by the packet generation unit 119 is modulated, in step S601, the CPU 111 of the control unit 110 of the power transmission apparatus 10 transmits the packet to the power reception apparatus 20.

Next, in step S602, the CPU 211 of the control unit 210 of the power reception apparatus 20 causes the power reception coil 231 in the wireless reception unit 230 to receive the modulated packet. Subsequently, the power reception coil 231 transmits the packet to the control unit 210 via the internal bus 240. The power reception apparatus 20 receives the packet in the device ID exchange (steps S201 and S202) in the association period (step S101) illustrated in FIG. 6 in which the power transmission apparatus 10 and the power reception apparatus 20 communicate with each other. In addition, the power reception apparatus 20 causes the power reception coil 231 in the wireless reception unit 230 to receive a modulated signal for performing communication from the power transmission apparatus 10. The diplexer 232 separates the modulated signal into a modulated signal of a communication data frequency and a modulated signal of a power frequency, and transmits the modulated signal of communication data to the reception circuit 233. The reception circuit 233 receives the communication data and the demodulation circuit 234 demodulates the communication data.

The CPU 211 of the control unit 210 of the power reception apparatus 20 causes the I/O unit 216 to receive the packet demodulated by the demodulation circuit 234 and causes the packet analysis unit 217 to analyze the received packet.

Next, in step S603, based on the analysis result obtained by the packet analysis unit 217, the CPU 211 of the control unit 210 of the power reception apparatus 20 recognizes the device ID request.

Next, in step S604, the CPU 211 of the control unit 210 of the power reception apparatus 20 causes the packet generation unit 218 to generate a packet including device ID information stored in the HDD 214. When generating the packet in step S604, the packet generation unit 218 inputs a device ID of the power reception apparatus 20 in the ID 311 in the frame header 310 illustrated in FIG. 5 and device ID provision in the frame control 312 in the frame header 310. In addition, the packet generation unit 218 inputs an address of the power reception apparatus 20 and an address of the power transmission apparatus 10 in the source address 313 and the destination address 314, respectively. In addition, the packet generation unit 218 inputs the device ID of the power reception apparatus 20 in the payload 321 in the frame body 320.

Next, in step S605, the CPU 211 of the control unit 210 of the power reception apparatus 20 transmits the generated packet from the I/O unit 216 to the wireless transmission unit 220 via the internal bus 240. The communication circuit 221 generates a modulated signal for performing communication and the power transmission coil 222 transmits the generated modulated signal to the power transmission apparatus 10. The power reception apparatus 20 transmits the packet in the device ID exchange (steps S201 and S202) in the association period (step S101) illustrated in FIG. 6 in which the power transmission apparatus 10 and the power reception apparatus 20 communicate with each other.

Next, in step S606, the CPU 111 of the control unit 110 of the power transmission apparatus 10 receives the packet and causes the packet analysis unit 118 to analyze the packet. The CPU 111 of the control unit 110 of the power transmission apparatus 10 acquires the device ID of the power reception apparatus 20, based on the packet analysis result obtained by the packet analysis unit 118.

Referring back to FIG. 7, in step S309, the CPU 111 of the control unit 110 of the power transmission apparatus 10 transmits a packet including the individual information stored in the HDD 114 to the power reception apparatus 20 (transmission process). Next, the transmission process in step S309 will be described with reference to a flowchart in FIG. 11.

In step S700, the CPU 111 of the control unit 110 of the power transmission apparatus 10 causes the packet generation unit 119 to generate a packet including the individual information. The packet generation unit 119 generates the packet by inputting the device ID of the power reception apparatus 20 in the ID 311 and the frame control 312 in the frame header 310, respectively. In addition, the packet generation unit 119 inputs an address of the power transmission apparatus 10 and an address of the power reception apparatus 20 in the source address 313 and the destination address 314, respectively. In addition, the packet generation unit 119 inputs the individual information and the device ID corresponding to the individual information in the payload 321 in the frame body 320. The input individual information is its own individual information and the individual information about the power transmission apparatuses 10 found by the search process in step S300.

In step S701, the CPU 111 of the control unit 110 of the power transmission apparatus 10 transmits the generated packet from the I/O unit 117 to the wireless transmission unit 120 via the internal bus 170. The wireless transmission unit 120 transmits the packet to the power reception apparatus 20. This process corresponds to an example of a process performed by a transmission unit.

Next, in step S702, the CPU 211 of the control unit 210 of the power reception apparatus 20 causes the power reception coil 231 in the wireless reception unit 230 to receive the modulated packet and causes the wireless reception unit 230 to transmit the packet to the control unit 210 via the internal bus 240. This process for receiving the modulated packet corresponds to an example of a process performed by a reception unit. The CPU 211 of the control unit 210 of the power reception apparatus 20 causes the I/O unit 216 to receive the packet demodulated by the demodulation circuit 234 and causes the packet analysis unit 217 to analyze the received packet.

Next, in step S703, the CPU 211 of the control unit 210 of the power reception apparatus 20 acquires the individual information and device ID, based on the packet analyzed by the packet analysis unit 217. The CPU 211 of the control unit 210 of the power reception apparatus 20 stores the acquired individual information and device ID in the HDD 214. Thus, in this step, the individual information about the search source power transmission apparatus 10 that has performed the search process in step S300, the corresponding device ID, the individual information about the search-target power transmission apparatuses 10, and the corresponding device IDs are stored in the HDD 214.

Referring back to FIG. 7, in step S310, the CPU 211 of the control unit 210 of the power reception apparatus 20 determines whether the individual information is acquired. If the power reception apparatus 20 has acquired the individual information (YES in step S310), the operation proceeds to step S311.

Figure 12:
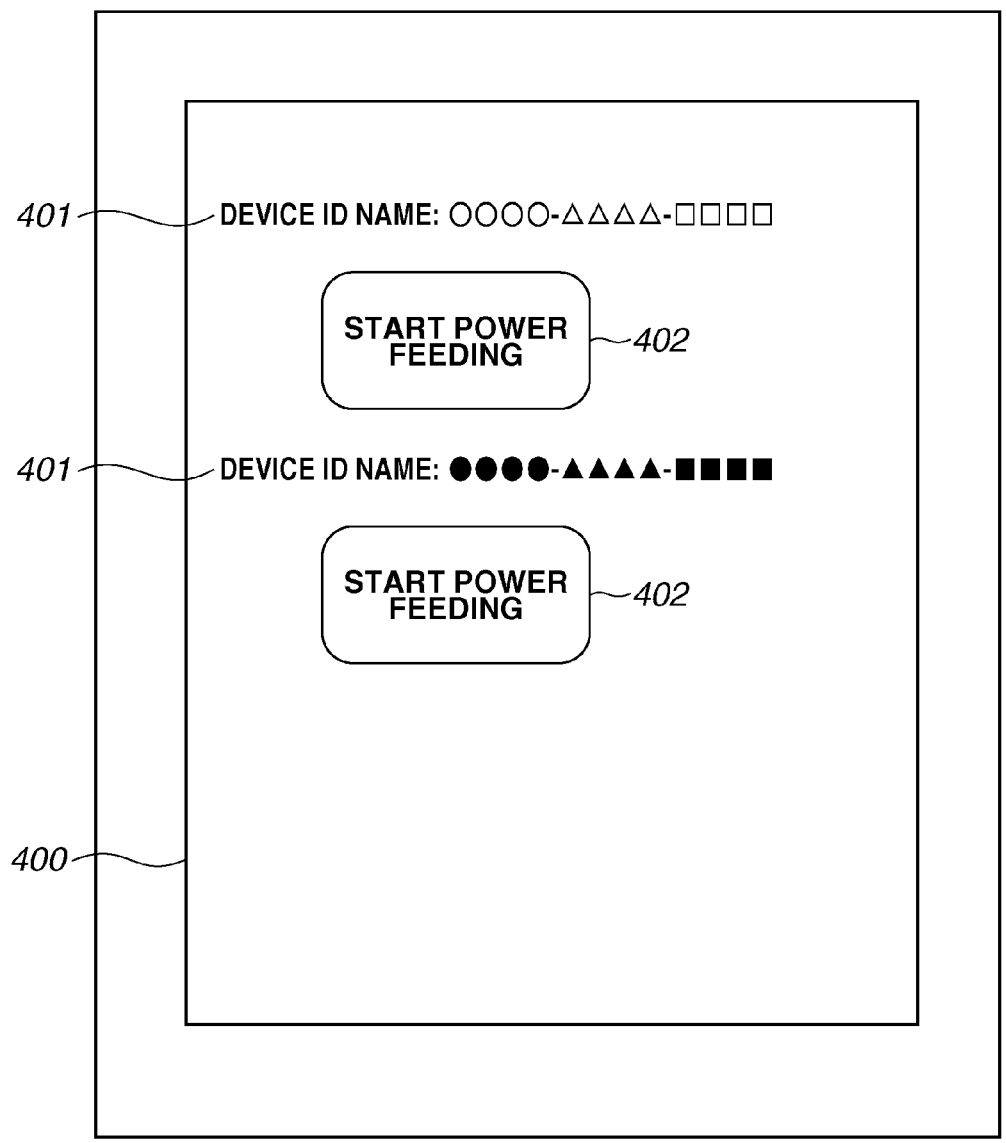
FIG. 12 illustrates an example of a power feeding start screen.

In step S311, to display information relating to power feeding, the CPU 211 of the control unit 210 of the power reception apparatus 20 displays a power feeding start screen 400 illustrated in FIG. 12 on the UI 215, based on the individual information stored in the HDD 214, more specifically, based on the flags and device IDs input in the individual information (display process).

Figure 13:
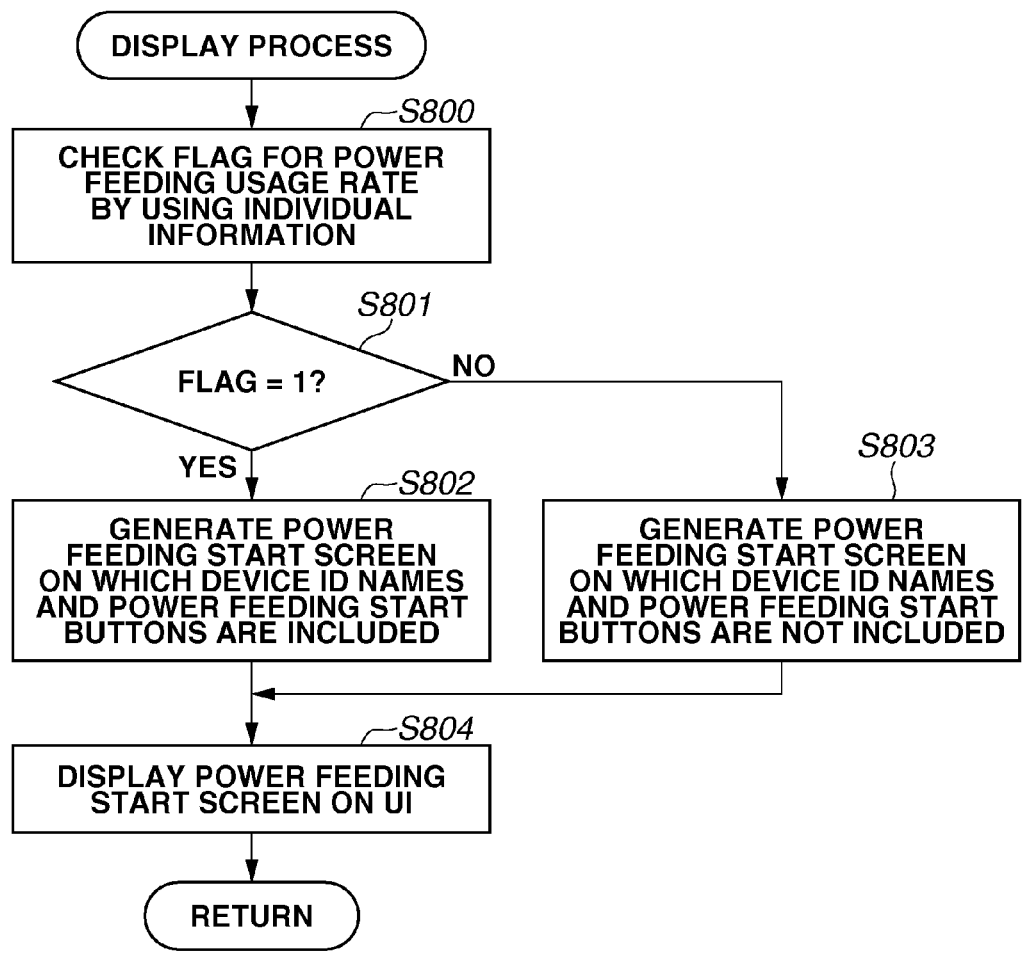
FIG. 13 is a flowchart illustrating a display process.

Next, the display process in step S311 will be described with reference to a flowchart in FIG. 13.

In step S800, the CPU 211 of the control unit 210 of the power reception apparatus 20 checks the flags for the power feeding usage rates of the power transmission apparatuses 10 by using the individual information stored in the HDD 214.

In step S801, the CPU 211 of the control unit 210 of the power reception apparatus 20 determines whether each flag for the power feeding usage rate represents "1". If it is determined that the flag for the power feeding usage rate is "1", i.e., if the power feeding usage rate falls below the threshold (YES in step S801), the operation proceeds to step S802. If not, i.e., if the power feeding usage rate exceeds the threshold (NO in step S801), the operation proceeds to step S803. In step S801, the CPU 211 performs the determination on the flag for the power feeding usage rate per acquired individual information. If the individual information includes the flag representing 2 (NO in step S801), the operation proceeds to step S803.

In step S802, the CPU 211 of the control unit 210 of the power reception apparatus 20 generates an image of the power feeding start screen 400 on which device ID names 401 of the power transmission apparatuses 10 corresponding to all the relevant individual information acquired and power feeding start buttons 402 for the device ID names 401 are included.

On the other hand, in step S803, the CPU 211 of the control unit 210 of the power reception apparatus 20 generates an image of the power feeding start screen 400 on which device ID names 401 of the power transmission apparatuses 10 corresponding to the individual information including the flag for the power feeding usage rate representing 2 among all the acquired individual information, and power feeding start buttons 402 for the device ID names 401 are not included.

In step S804, as illustrated in FIG. 12, the CPU 211 of the control unit 210 of the power reception apparatus 20 displays the power feeding start screen 400 including the device ID names 401 as the identification information of the power transmission apparatuses 10 and the power feeding start buttons 402 on the UI 215. This process corresponds to an example of a process performed by a display unit. The power feeding start buttons 402 are displayed to be selectable via the UI 215 by the user.

The CPU 211 may display a device ID of a power transmission apparatus 10 whose individual information represents flag 2. In this case, since the power feeding usage rate is above the threshold, the device ID is grayed out so that the user can recognize that this device ID cannot be selected, for example. In addition, if there is only one power transmission apparatus 10 whose individual information represents flag 1, the CPU 211 may cause the UI 215 to display only one power feeding start button 402 on the power feeding start screen 400.

Referring back to FIG. 7, in step S312, it is determined whether the power reception apparatus 20 has entered the power feeding area 30. If it is determined that the power reception apparatus 20 has entered the power feeding area 30 (YES in step S312), the packet generation unit 119 of the power transmission apparatus 10 generates a packet to be used for checking necessity of power (step S203) for the power reception apparatus 20 in the association period (step S101). The packet generation unit 119 generates the packet by inputting information about power request check in the power management 3120 in the frame control 312. In addition, the packet generation unit 119 inputs an address of the power transmission apparatus 10 and an address of the power reception apparatus 20 in the source address 313 and the destination address 314, respectively. The CPU 111 of the control unit 110 of the power transmission apparatus 10 transmits the generated packet to the wireless transmission unit 120 from the I/O unit 117 via the internal bus 170. The wireless transmission unit 120 transmits the packet to the power reception apparatus 20.

The CPU 211 of the control unit 210 of the power reception apparatus 20 receives the packet. The CPU 211 receives the packet for checking necessity of power (step S203) in the association period (step S101) illustrated in FIG. 6 in which the power transmission apparatus 10 and the power reception apparatus 20 communicate with each other.

The CPU 211 of the control unit 210 of the power reception apparatus 20 causes the I/O unit 216 to receive the packet for power request check demodulated by the demodulation circuit 234 and causes the packet analysis unit 217 to analyze the received packet. Based on the analysis result obtained by the packet analysis unit 217, the CPU 211 recognizes that the power reception apparatus 20 is being checked about power feeding.

In step S313, the user selects a power feeding start button 402 displayed on the UI 215, and the CPU 211 of the control unit 210 of the power reception apparatus 20 causes the packet generation unit 218 to generate a packet including a request for power feeding to the power transmission apparatus 10. The power reception apparatus transmits the packet in answering about necessity of power (step S204) in the association period (step S101) illustrated in FIG. 6 in which the power transmission apparatus 10 and the power reception apparatus 20 communicate with each other. When generating the packet, the packet generation unit 218 inputs information about necessity of power in the power management 3120 in the frame control 312 in the frame header 310 illustrated in FIG. 5. The CPU 211 of the control unit 210 of the power reception apparatus 20 transmits the generated packet from the I/O unit 216 to the wireless transmission unit 220 via the internal bus 240. The wireless transmission unit 220 transmits the packet to the power transmission apparatus 10. This process corresponds to an example of a process performed by a power feeding request unit.

The CPU 211 of the control unit 210 of the power reception apparatus 20 may transmit the packet to the power transmission apparatus 10 corresponding to the selected power feeding start button 402 or to the power transmission apparatus 10 that has transmitted the individual information in step S309. If the power transmission apparatus 10 that has transmitted the individual information and the power transmission apparatus 10 corresponding to the power feeding start button 402 are different, the power transmission apparatus 10 that has received the packet transfers the packet to the power transmission apparatus 10 corresponding to the selected power feeding start button 402.

The CPU 111 of the control unit 110 of the power transmission apparatus 10 receives the packet. The power transmission apparatus 10 receives the packet in answering necessity of power (step S204) in the association period (step S101) in FIG. 6 in which the power transmission apparatus 10 and the power reception apparatus 20 communicate with each other. The CPU 111 of the control unit 110 of the power transmission apparatus 10 causes the I/O unit 117 to receive the power request packet demodulated by the demodulation circuit 134 and causes the packet analysis unit 118 to analyze the received packet. The CPU 111 of the control unit 110 of the power transmission apparatus 10 recognizes the power request, based on the analysis result obtained by the packet analysis unit 118.

Thus, the CPU 111 of the control unit 110 of the power transmission apparatus 10 performs preparing for power transmission (step S205) in the power transmission preparation period (step S102) illustrated in FIG. 6.

After preparing for power transmission (step S205) is completed, the CPU 111 of the control unit 110 of the power transmission apparatus 10 starts to perform transmitting power (step S206) in the power transmission period (step S103) illustrated in FIG. 6. This process corresponds to an example of a process performed by a power feeding unit.

When the battery is fully charged, in step S207, the CPU 211 of the control unit 210 of the power reception apparatus 20 notifies the power transmission apparatus 10 of completion of the power transmission. When generating a packet for this notification, the power reception apparatus 20 inputs information about completion of charging in the power management 3120 in the frame control 312 in the frame header 310 illustrated in FIG. 5.

Thus, according to the present exemplary embodiment, since power transmission apparatuses 10 that can perform power feeding are displayed on the UI 215 of the power reception apparatus 20, the user can easily select a power transmission apparatus 10 for power feeding.

Figure 14:
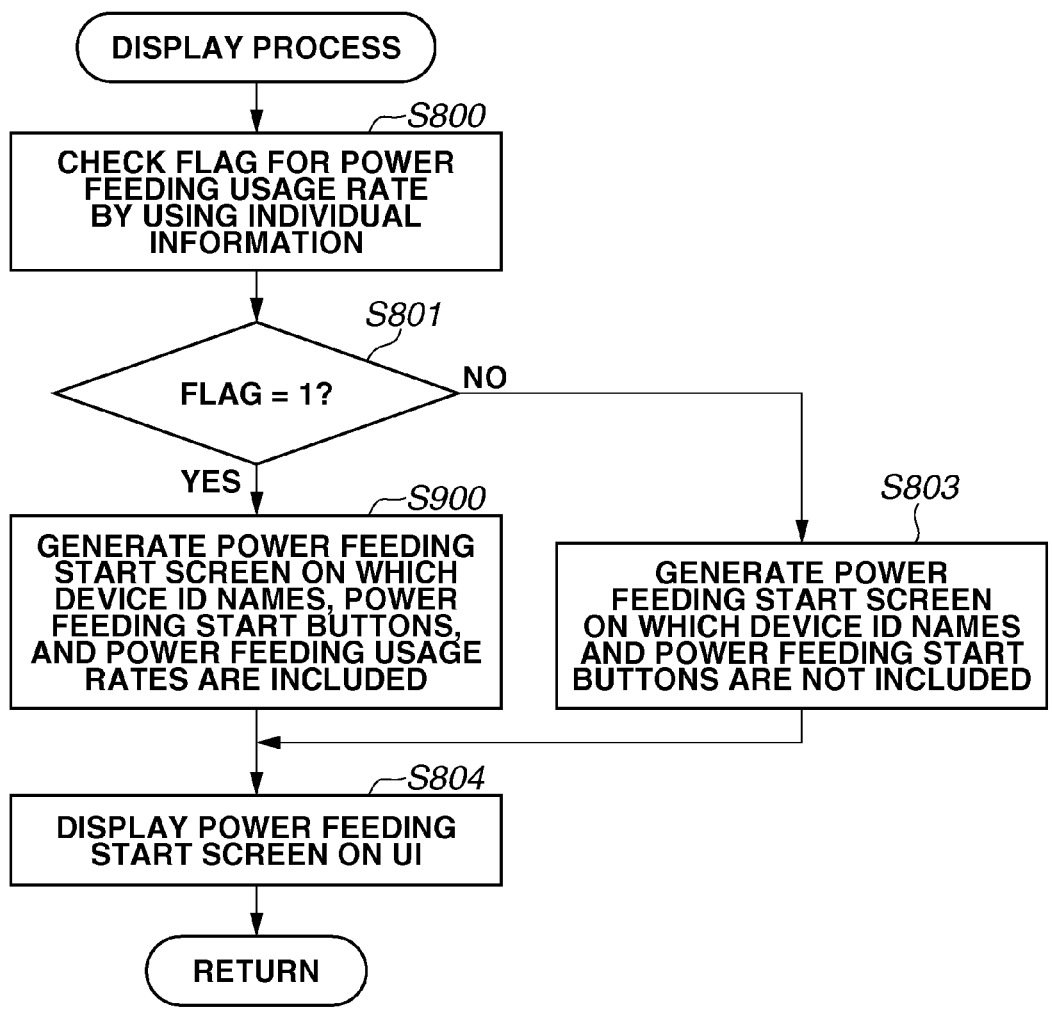
FIG. 14 is a flowchart illustrating another display process.

In the present exemplary embodiment, the device ID names 401 and the power feeding start buttons 402 are displayed on the UI 215. However, the present exemplary embodiment is not limited to such example, and the power feeding usage rates included in the individual information may be displayed. Next, a display process for displaying power feeding usage rates will be described with reference to a flowchart in FIG. 14. In the flowchart in FIG. 14, step S802 in the flowchart in FIG. 13 is replaced by step S900. Other steps are denoted by the same reference symbols, and redundant description will be avoided.

In step S900, the CPU 211 of the control unit 210 of the power reception apparatus 20 generates an image of the power feeding start screen 400 on which information 403 about the power feeding usage rates included in the acquired individual information are included in addition to the device ID names 401 and the power feeding start buttons 402.

Figure 15:
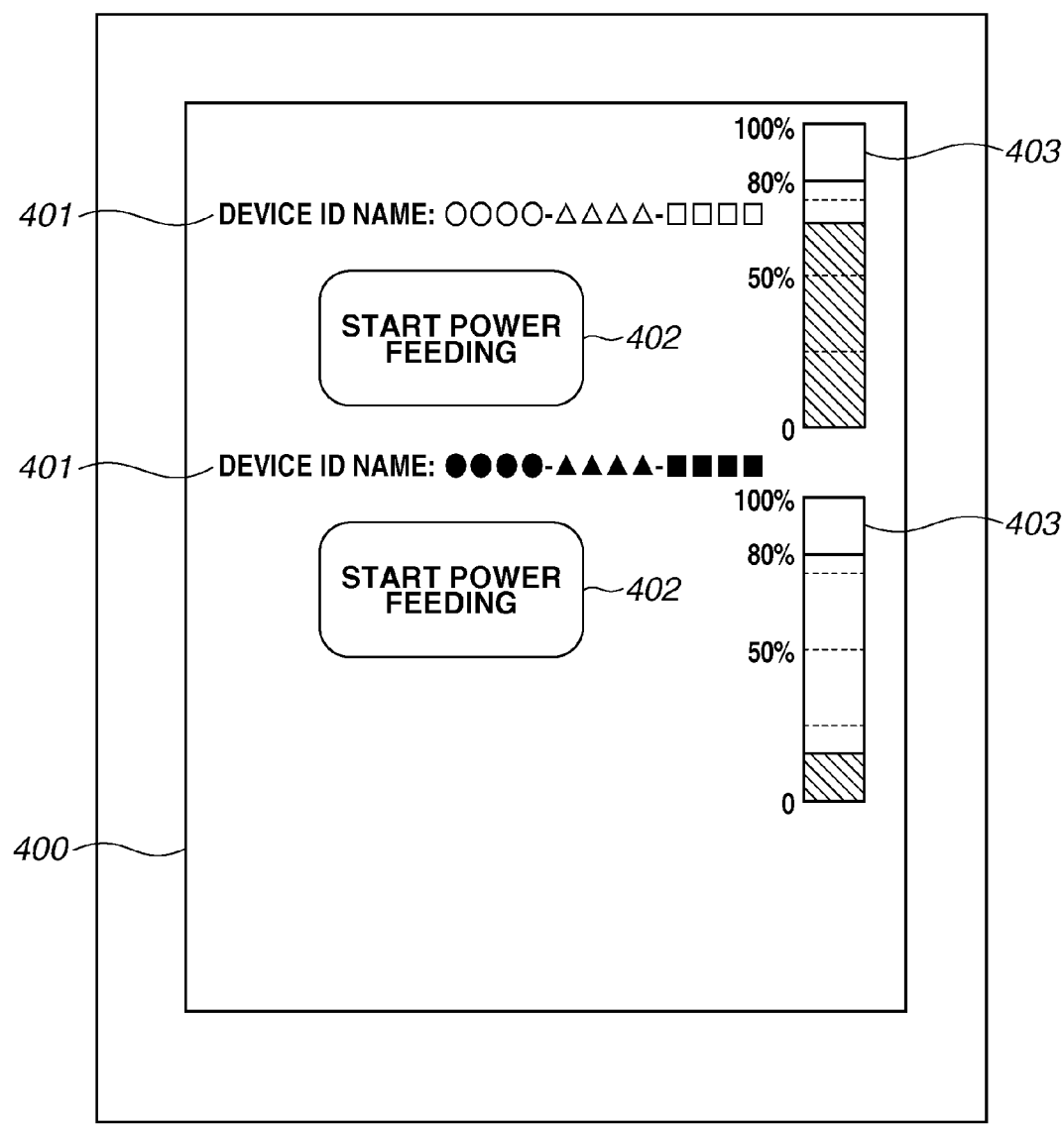
FIG. 15 illustrates another power feeding start screen.

FIG. 15 illustrates a power feeding start screen 400 generated in step S900. In FIG. 15, information 403 about each power feeding usage rate is displayed by an indicator, and a threshold (80%) for each power feeding usage rate is also displayed. Thus, the user can recognize the power feeding usage rates of the power transmission apparatuses 10 and can select a power transmission apparatus 10 with a low power feeding usage rate for power feeding, for example.

Figure 16:
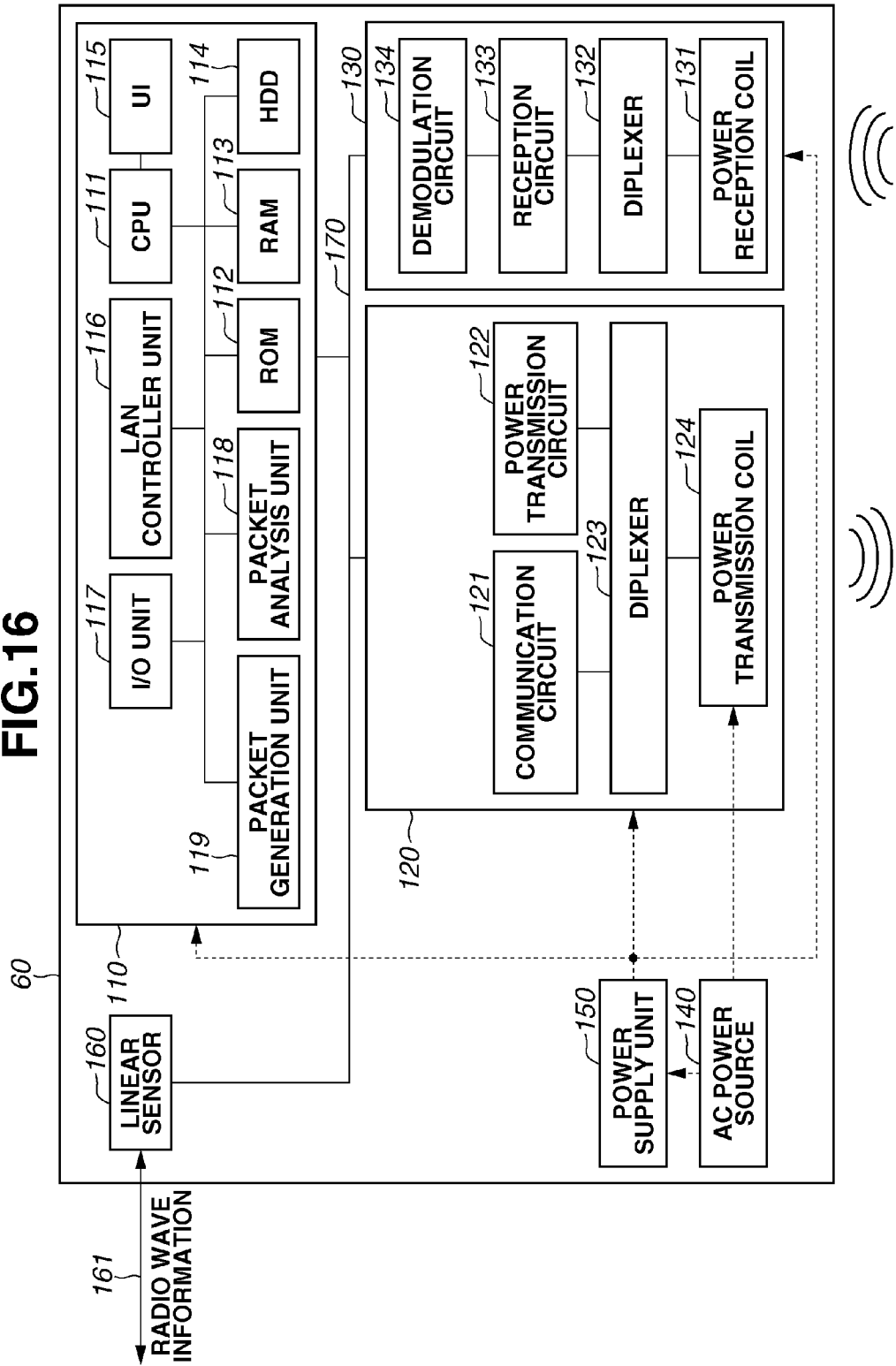
FIG. 16 is a block diagram illustrating a configuration of a power transmission apparatus according to a second exemplary embodiment.

FIG. 16 is a block diagram illustrating a configuration of a power transmission apparatus 60 in a wireless power feeding system according to a second exemplary embodiment. In FIG. 16, the same components as those of the power transmission apparatus 10 according to the first exemplary embodiment are denoted by the same reference symbols, and redundant description will be avoided.

The power transmission apparatus 60 according to the second exemplary embodiment additionally includes a linear sensor 160 as a detection unit. The linear sensor 160 transmits a microwave to a power reception apparatus 20 and acquires radio wave information 161 from a reflected wave. Based on the radio wave information 161 acquired by the linear sensor 160, the CPU 111 of the control unit 110 of the power transmission apparatus 60 measures the distance from the power reception apparatus 20 to acquire positional information about the power reception apparatus 20.

Figure 17:
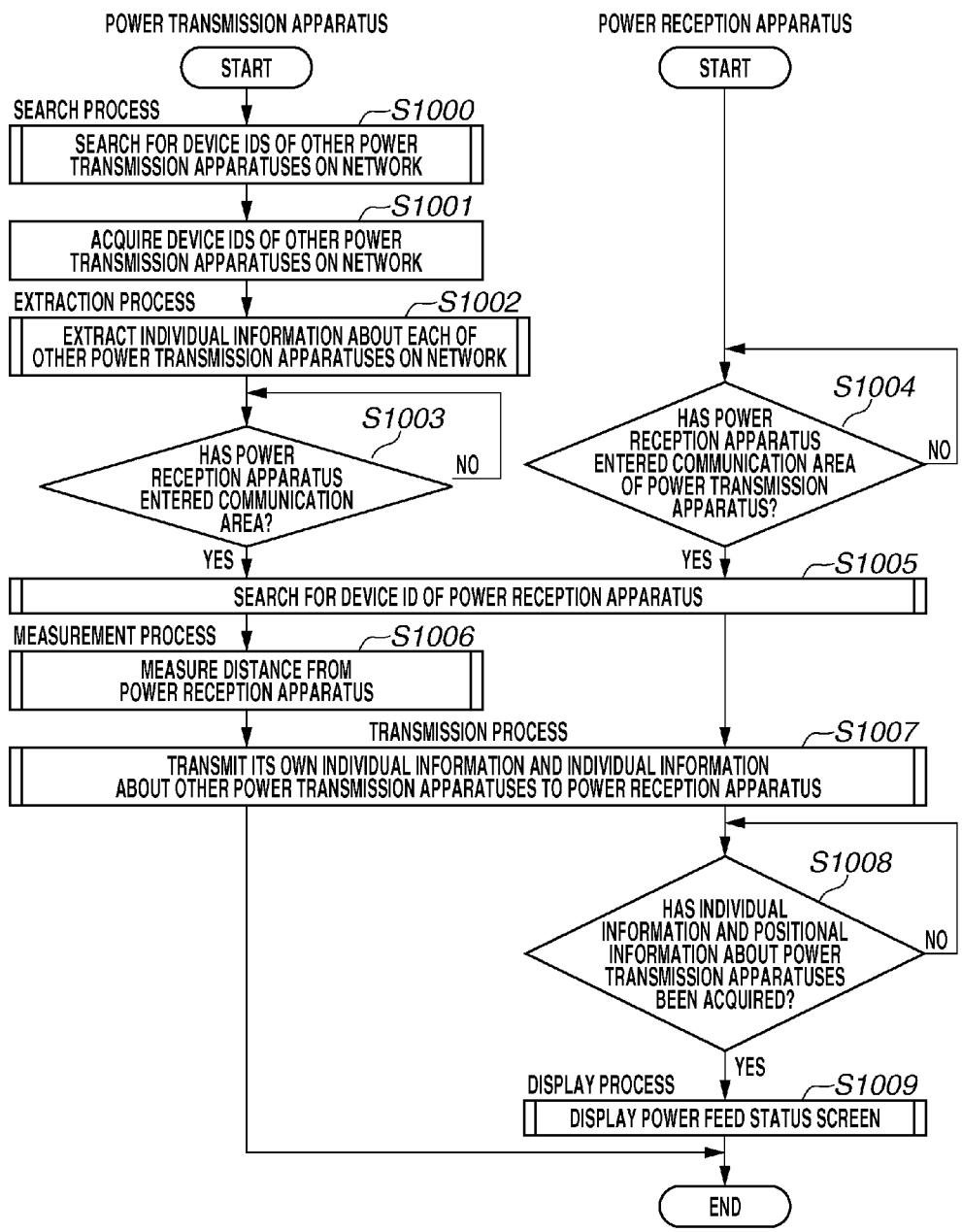
FIG. 17 is a flowchart illustrating a process in a wireless power feeding system according to the second exemplary embodiment.

Next, a process in which the power transmission apparatus 60 feeds power to the power reception apparatus 20 in the wireless power feeding system according to the second exemplary embodiment will be described with reference to a flowchart in FIG. 17.

First, in step S1000, the CPU 111 of the control unit 110 of the power transmission apparatus 60 searches for device IDs of other power transmission apparatuses 60 through the network 50 at an arbitrary timing (search process). This step is similar to step S300 in FIG. 7.

Next, the search process performed in step S1000 will be described with reference to the flowchart in FIG. 8. Since this process includes steps similar to those in the flowchart in FIG. 8 in the first exemplary embodiment, only the main steps will be described.

First, in step S400, the CPU 111 of the control unit 110 of the power transmission apparatus 60 causes the packet generation unit 119 to generate a packet for searching for a device ID at an arbitrary timing.

In step S401, the CPU 111 of the control unit 110 of the power transmission apparatus 60 transmits the packet from the I/O unit 117 to the wireless transmission unit 120 via the internal bus 170. The diplexer 123 in the wireless transmission unit 120 modulates the packet for searching for a device ID. The power transmission coil 124 transmits the modulated packet to each of the other power transmission apparatuses 60 on the network 50. The power transmission coil 124 transmits the packet in of the device ID exchange (steps S201 and S202) in the association period (step S101) illustrated in FIG. 6.

In step S402, the CPU 111 of the control unit 110 of the other power transmission apparatus 60 causes the power reception coil 131 of the wireless reception unit 130 to receive the modulated packet and causes the wireless reception unit 130 to transmit the packet to the control unit 110 via the internal bus 170. The CPU 111 of the control unit 110 of the other power transmission apparatus 60 causes the packet analysis unit 118 to analyze the received packet.

In step S403, based on the analysis result obtained by the packet analysis unit 118, the CPU 111 of the control unit 110 of the other power transmission apparatus 60 recognizes the device ID request.

In step S404, the CPU 111 of the control unit 110 of the other power transmission apparatus 60 causes the packet generation unit 119 to generate a packet having device ID information stored in the HDD 114. Next, in step S405, the CPU 111 of the control unit 110 of the other power transmission apparatus 60 transmits the generated packet from the I/O unit 117 to the wireless transmission unit 120 via the internal bus 170. The diplexer 123 in the wireless transmission unit 120 modulates the packet and the power transmission coil 124 transmits the modulated packet to the search source power transmission apparatus 60 on the network 50. The power transmission coil 124 transmits the packet in the device ID exchange (steps S201 and S202) in the association period (step S101) illustrated in FIG. 6.

Next, in step S406, the CPU 111 of the control unit 110 of the power transmission apparatus 60 receives the packet and causes the packet analysis unit 118 to analyze the packet.

Referring back to FIG. 17, in step S1001, the CPU 111 of the control unit 110 of the power transmission apparatus 60 acquires the device IDs of the other power transmission apparatuses 60, based on the packet analysis results obtained by the packet analysis unit 118. The CPU 111 of the control unit 110 of the power transmission apparatus 60 stores the acquired device IDs of the other power transmission apparatuses 60 in the HDD 114.

In step S1002, the CPU 111 of the control unit 110 of the power transmission apparatus 60 extracts individual information about each of the other power transmission apparatuses 60 that have been searched for (extraction process).

Next, the extraction process performed in step S1002 will be described with reference to the flowchart in FIG. 9. Since this process includes steps similar to those in the flowchart in FIG. 9 in the first exemplary embodiment, only the main steps will be described.

First, in step S500, the CPU 111 of the control unit 110 of the power transmission apparatus 60 causes the packet generation unit 119 to generate a packet for extracting individual information.

In step S501, the CPU 111 of the control unit 110 of the power transmission apparatus 60 transmits the generated packet to the search-target power transmission apparatus 60.

In step S502, the CPU 111 of the control unit 110 of the search-target power transmission apparatus 60 causes the packet analysis unit 118 to analyze the received packet.

Next, in step S503, based on the analysis result obtained by the packet analysis unit 118, the CPU 111 of the control unit 110 of the search-target power transmission apparatus 60 recognizes the individual information request.

Next, in step S504, the CPU 111 of the control unit 110 of the search-target power transmission apparatus 60 causes the packet generation unit 119 to generate a packet having individual information stored in the HDD 114. When generating the packet, the packet generation unit 119 inputs a device ID of the search source power transmission apparatus 60 in the ID 311 in the frame header 310 and information about individual information provision in the frame control 312. In addition, the packet generation unit 119 inputs an address of the power transmission apparatus 60 having the search-target device ID and an address of the search source power transmission apparatus 60 in the source address 313 and the destination address 314, respectively. In addition, the packet generation unit 119 inputs individual information about the power transmission apparatus 60 having the search-target device ID in the payload 321 in the frame body 320.

Next, in step S505, the CPU 111 of the control unit 110 of the search-target power transmission apparatus 60 transmits the generated packet to the search source power transmission apparatus 60.

In step S506, the CPU 111 of the control unit 110 of the search source power transmission apparatus 60 receives the packet and causes the packet analysis unit 118 to analyze the packet.

In step S507, based on the packet analysis result obtained by the packet analysis unit 118, the CPU 111 of the control unit 110 of the search source power transmission apparatus 60 acquires the individual information about the power transmission apparatus 60 having the search-target device ID and extracts the individual information. The CPU 111 of the control unit 110 of the search source power transmission apparatus 60 stores the extracted individual information about the power transmission apparatus 60 in the HDD 114.

Referring back to FIG. 17, in step S1003, the power transmission apparatus 60 determines whether the power reception apparatus 20 has entered the communication area 40. If the power reception apparatus 20 has entered the communication area 40 (YES in step S1003), the operation proceeds to step S1005. Similarly, in step S1004, the power reception apparatus 20 determines whether the power reception apparatus 20 has entered the communication area 40 of the power transmission apparatus 60. If the power reception apparatus 20 has entered the communication area 40 (YES in step S1004), the operation proceeds to step S1005.

In step S1005, the power transmission apparatus 60 searches for a device ID of the power reception apparatus 20 that has entered the communication area 40 (search process).

Next, the search process in step S1005 will be described with reference to a flowchart in FIG. 10. Since this process includes steps similar to those according to the first exemplary embodiment, only the main steps will be described.

In step S600, the CPU 111 of the control unit 110 of the power transmission apparatus 60 causes the packet generation unit 119 to generate a packet for searching for a device ID.

After the packet generated by the packet generation unit 119 is modulated, in step S601, the CPU 111 of the control unit 110 of the power transmission apparatus 60 transmits the modulated packet to the power reception apparatus 20.

In step S602, the CPU 211 of the control unit 210 of the power reception apparatus 20 causes the power reception coil 231 in the wireless reception unit 230 to receive the modulated packet. The wireless reception unit 230 transmits the packet to the control unit 210 via the internal bus 240. The CPU 211 of the control unit 210 of the power reception apparatus 20 causes the I/O unit 216 to receive the packet including a device ID request and causes the packet analysis unit 217 to analyze the received packet.

In step S603, based on the analysis result obtained by the packet analysis unit 217, the CPU 211 of the control unit 210 of the power reception apparatus 20 recognizes the device ID request.

In step S604, the CPU 211 of the control unit 210 of the power reception apparatus 20 causes the packet generation unit 218 to generate a packet including device ID information stored in the HDD 214.

In step S605, the CPU 211 of the control unit 210 of the power reception apparatus 20 transmits the generated packet from the I/O unit 216 to the wireless transmission unit 220 via the internal bus 240. The communication circuit 221 modulates a packet for searching for a device ID, and the wireless transmission unit 220 transmits the packet modulated by the power transmission coil 222 to the power transmission apparatus 60.

In step S606, the CPU 111 of the control unit 110 of the power transmission apparatus 60 receives the packet and causes the packet analysis unit 118 to analyze the packet. The CPU 111 of the control unit 110 of the power transmission apparatus 60 acquires the device ID of the power reception apparatus 20, based on the packet analysis result obtained by the packet analysis unit 118.

Referring back to FIG. 17, in step S1006, the CPU 111 of the control unit 110 of the power transmission apparatus 60 measures the distance from the power reception apparatus 20 whose device ID has been acquired (measurement process).

Figure 18:
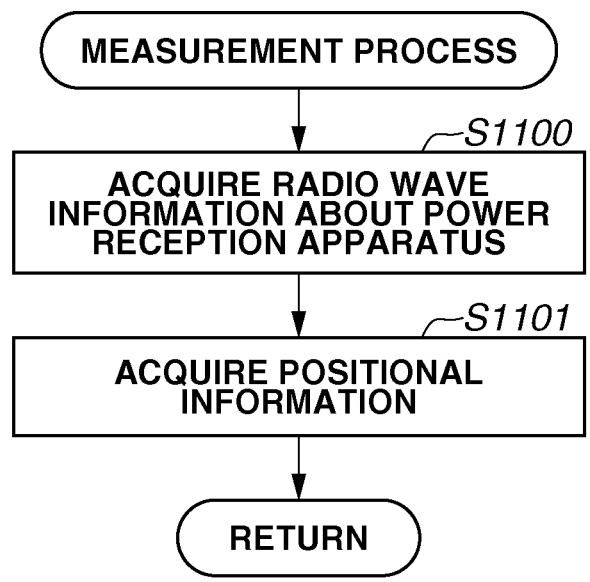
FIG. 18 is a flowchart illustrating a measurement process.

Next, the measurement process in step S1006 will be described with reference to a flowchart in FIG. 18. First, in step S1100, the CPU 111 of the control unit 110 of the power transmission apparatus 60 acquires the radio wave information 161 from the power reception apparatus 20 by using the linear sensor 160.

Next, in step S1101, the CPU 111 of the control unit 110 of the power transmission apparatus 60 acquires positional information from the acquired radio wave information and stores the acquired positional information in the HDD 114.

Referring back to FIG. 17, in step S1007, the CPU 111 of the control unit 110 of the power transmission apparatus 60 transmits a packet including the individual information and the positional information stored in the HDD 114 to the power reception apparatus 20 (transmission process).

Figure 11:
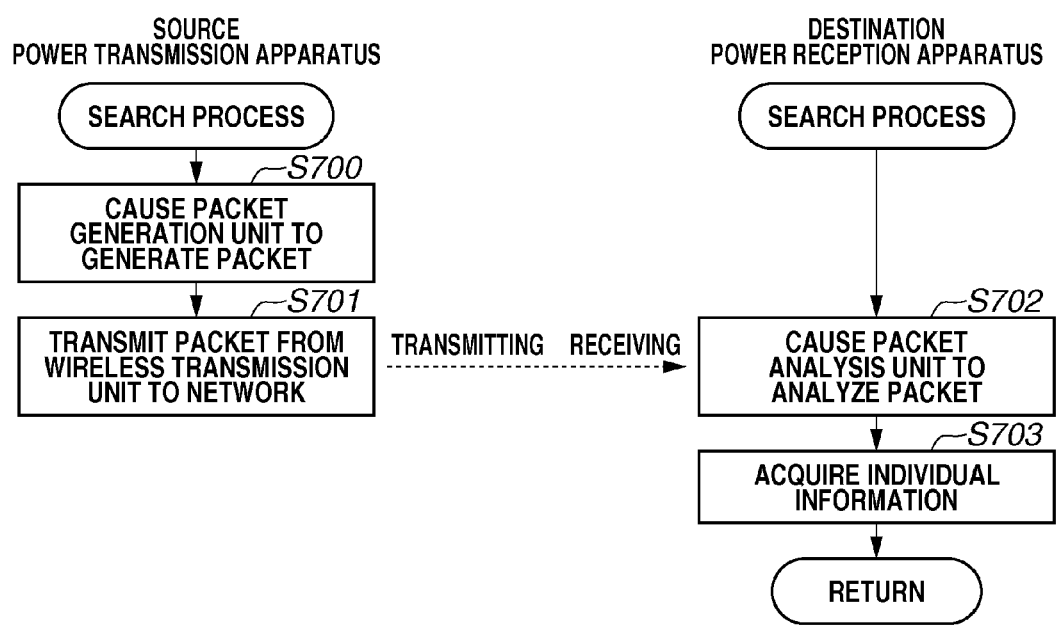
FIG. 11 is a flowchart illustrating a transmission process.

Next, the transmission process in step S1007 will be described with reference to a flowchart in FIG. 11. Since this process includes steps similar to those according to the first exemplary embodiment, only the main steps will be described.

In step S700, the CPU 111 of the control unit 110 of the power transmission apparatus 60 causes the packet generation unit 119 to generate a packet including individual information. When generating the packet, the packet generation unit 119 inputs a device ID of the power reception apparatus 20 in the ID 311 in the frame header 310 and information about individual information provision and positional information provision in the frame control 312. In addition, the packet generation unit 119 inputs an address of the power transmission apparatus 60 and an address of the power reception apparatus 20 in the source address 313 and the destination address 314, respectively. In addition, the packet generation unit 119 inputs individual information, a device ID corresponding to the individual information, and positional information in the payload 321 in the frame body 320. The input individual information includes the individual information about the power transmission apparatuses 60 searched in the search process in step S1000 and the individual information about the search source power transmission apparatus 60.

Next, in step S701, the CPU 111 of the control unit 110 of the power transmission apparatus 60 transmits the generated packet to the power reception apparatus 20.

Next, in step S702, the CPU 211 of the control unit 210 of the power reception apparatus 20 causes the power reception coil 231 in the wireless reception unit 230 to receive the modulated packet, causes the reception circuit 233 to receive the packet via the diplexer 232, and causes the demodulation circuit 234 to demodulate the packet. The CPU 211 of the control unit 210 of the power reception apparatus 20 receives the converted signal via the I/O unit 216 and causes the packet analysis unit 217 to analyze the signal.

In step S703, the CPU 211 of the control unit 210 of the power reception apparatus 20 acquires the individual information, the device ID, and the positional information, based on the packet analyzed by the packet analysis unit 217. The CPU 211 of the control unit 210 of the power reception apparatus 20 stores the acquired individual information, device ID, and positional information in the HDD 214.

Referring back to FIG. 17, in step S1008, the CPU 211 of the control unit 210 of the power reception apparatus 20 determines whether the individual information and positional information have been acquired. If the CPU 211 has acquired the individual information and positional information (YES in step S1008), the operation proceeds to step S1009.

Figure 20:
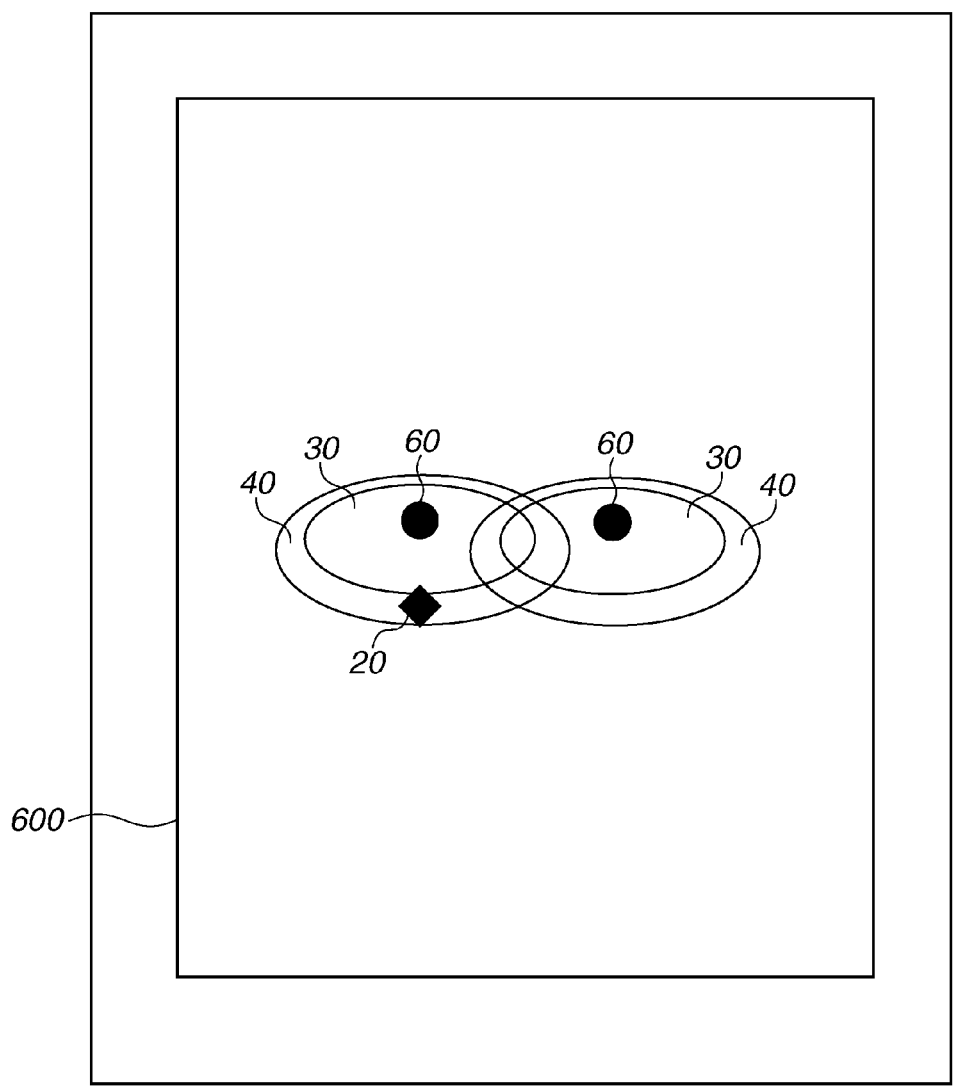
FIG. 20 illustrates an example of a power feeding status screen.

In step S1009, based on the individual information and the positional information stored in the HDD 214, the CPU 211 of the control unit 210 of the power reception apparatus 20 displays a power feed status screen 600 as information displayed relating to power feeding on the UI 215, as illustrated in FIG. 20 (display process).

Figure 19:
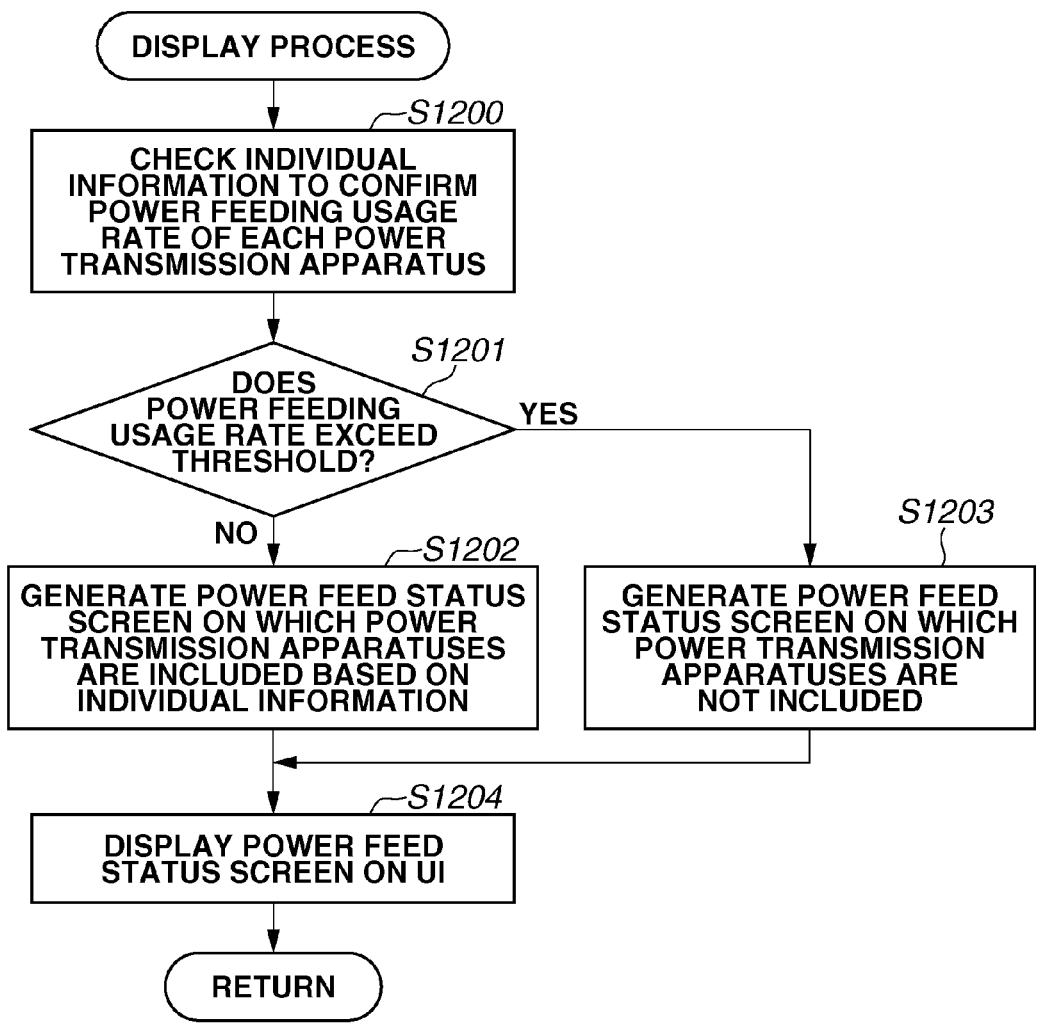
FIG. 19 is a flowchart illustrating a display process.

Next, the display process in step S1009 will be described with reference to a flowchart in FIG. 19. First, in step S1200, the CPU 211 of the control unit 210 of the power reception apparatus 20 checks the individual information stored in the HDD 214 to confirm the power feeding usage rate of each power transmission apparatus 60.

Next, in step S1201, the CPU 211 of the control unit 210 of the power reception apparatus 20 determines whether the power feeding usage rate exceeds a set threshold. If the power reception apparatus 20 determines that the power feeding usage rate exceeds the set threshold (YES in step S1201), the operation proceeds to step S1203. If not (NO in step S1201), the operation proceeds to step S1202. In step S1201, the CPU 211 determines whether the power feeding usage rate exceeds the threshold per acquired individual information. If a power feeding usage rate exceeding the threshold exists (YES in step S1201), the operation proceeds to step S1203.

The power reception apparatus 20 may perform the determination in a different manner. For example, as in the first exemplary embodiment, the power transmission apparatus 60 may determine whether power feeding needs to be performed and the power reception apparatus 20 may determine whether the power feeding usage rate exceeds the threshold by referring to a flag representing permission of power feeding included in the individual information.

In step S1202, the CPU 211 of the control unit 210 of the power reception apparatus 20 generates an image of the power feed status screen 600 on which communication areas 40 and the power feeding areas 30 of the power transmission apparatuses 60 corresponding to all the relevant individual information acquired are included, with the current position of the power transmission apparatus 60 as the center. At this time, the CPU 211 of the control unit 210 of the power reception apparatus 20 generates an image on which the position of the power reception apparatus 20 is superimposed based on the positional information.

On the other hand, in step S1203, the CPU 211 of the control unit 210 of the power reception apparatus 20 generates an image of the power feed status screen 600 on which power transmission apparatuses 60 whose power feeding usage rate exceeds the threshold are not included. As in step S1202, the CPU 211 of the control unit 210 of the power reception apparatus 20 generates an image on which the position of the power reception apparatus 20 is superimposed based on the positional information.

In step S1204, the CPU 211 of the control unit 210 of the power reception apparatus 20 displays an image of the generated power feed status screen 600 on the UI 215. The image of the power feed status screen 600 illustrated in FIG. 20 displays the positions, the power feeding areas 30, and the communication areas 40 of the power transmission apparatuses 60 whose power feeding usage rates do not exceed the threshold, and the position of the power reception apparatus 20. The CPU 211 of the control unit 210 of the power reception apparatus 20 may display the device ID names of the respective power transmission apparatuses 60.

Subsequently, as in the first exemplary embodiment, the power transmission apparatus 60 may start to feed power to the power reception apparatus 20 in accordance with a power feeding start instruction from the user or when the power reception apparatus 20 enters the power feeding area 30 of the power transmission apparatus 60. Since the process in which the power transmission apparatus 60 feeds power to the power reception apparatus is similar to that according to the first exemplary embodiment, redundant description will be avoided.

Thus, according to the present exemplary embodiment, since the positions, the power feeding areas 30, and the communication areas 40 of the power transmission apparatuses 60 that can perform power feeding, and the position of the power reception apparatus 20 can be displayed on the UI 215 of the power reception apparatus 20, the user can easily grasp which power transmission apparatus can be used for power feeding to the power reception apparatus 20.

In the present exemplary embodiment, the power transmission apparatus 60 uses the linear sensor 160 to acquire the positional information about the power reception apparatus 20. However, the present exemplary embodiment is not limited thereto.

Figure 21:
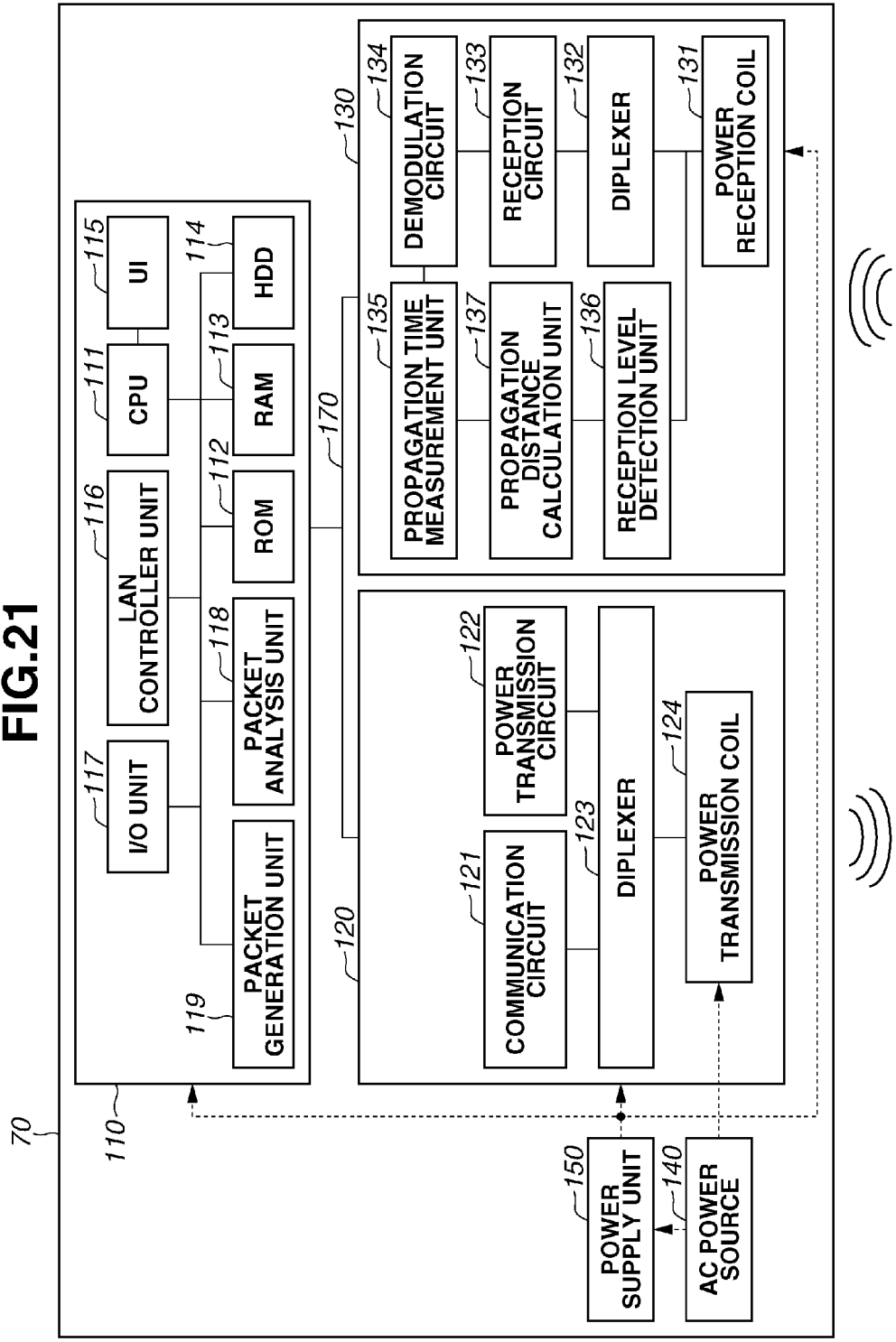
FIG. 21 is a block diagram illustrating a configuration of another power transmission apparatus.

FIG. 21 is a block diagram illustrating another configuration of a power transmission apparatus 70 that can acquire the positional information about the power reception apparatus 20. A propagation time measurement unit 135, a reception level detection unit 136, and a propagation distance calculation unit 137 are added to the power transmission apparatus 70 illustrated in the block diagram in FIG. 21, while the linear sensor 160 in the block diagram in FIG. 16 is eliminated.

The reception level detection unit 136 receives an analog reception signal and detects a reception level (for example, a reception power level) of the received wireless signal. By using a demodulated signal obtained by the demodulation circuit 134, the propagation time measurement unit 135 measures propagation time required by the wireless signal transmitted from the power reception apparatus 20 to reach the power transmission apparatus 70. Based on the propagation time measured by the propagation time measurement unit 135 and the level detected by the reception level detection unit 136, the propagation distance calculation unit 137 calculates the distance between the power reception apparatus 20 and the power transmission apparatus 70. The CPU 111 of the control unit 110 of the power transmission apparatus 70 acquires the positional information about the power reception apparatus 20 from the calculated distance. The propagation time measurement unit 135, the reception level detection unit 136, and the propagation distance calculation unit 137 correspond to an example of a detection unit.

While the present invention has thus been described based on various exemplary embodiments, the present invention is not limited thereto. Variations or the like can be made without departing from the scope of the present invention. The above exemplary embodiments may be combined as needed. For example, the above power transmission apparatuses 10, 60, and 70 may communicate with each other by wired or wireless connection. In addition, the power transmission apparatuses 10, 60, and 70 may communicate with each other not only by using the respective wireless transmission units 120 and the respective wireless reception units 130 but also by using the respective LAN controller units 116.

In addition, the threshold for the power feeding usage rate may be set in advance or may be set through communication among the power transmission apparatuses 10, 60, and 70.

In addition, a power reception apparatus may receive power from a plurality of power transmission apparatuses 10, 60, and 70, not just from one power transmission apparatus 10, 60, or 70. In such case, the power reception apparatus 20 may display a button for allowing a plurality of power transmission apparatuses to start power feeding. Alternatively, the user may select a plurality of power feeding start buttons 402 illustrated in FIGS. 12 and 15.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076983 filed Apr. 2, 2013, which is hereby incorporated by reference herein in its entirety.

What is claimed is:

1. A power reception apparatus configured to receive power wirelessly from a power transmission apparatus, the power reception apparatus comprising:
a reception unit configured to receive apparatus information of a plurality of power transmission apparatuses including at least a first power transmission apparatus and a second power transmission apparatus;
a display unit configured to display an instruction screen for instructing a power transmission apparatus to start supplying power, based on the apparatus information received by the reception unit, wherein at least a name of the first power transmission apparatus, a first instruction button for instructing the first power transmission apparatus to start supply power, a name of the second power transmission apparatus, and a second instruction button for instructing the second power transmission apparatus are displayed in the instruction screen; and
an instruction unit configured to instruct a power transmission apparatus which is selected by a user on the instruction screen, to supply power wirelessly to the power reception apparatus,
wherein if the first instruction button is selected by a user on the instruction screen, the instruction unit instructs the first power transmission apparatus to supply power wirelessly to the power reception apparatus, and if the second instruction button is selected by a user on the instruction screen, the instruction unit instructs the second power transmission apparatus to supply power wirelessly to the power reception apparatus.

2. A method for controlling wireless power a power reception apparatus configured to receive power wirelessly from a power transmission apparatus, the method comprising:
receiving apparatus information of a plurality of power transmission apparatuses including at least a first power transmission apparatus and a second power transmission apparatus;
displaying an instruction screen for instructing a power transmission apparatus to start supplying power, based on the apparatus information received, wherein at least a name of the first power transmission apparatus, a first instruction button for instructing the first power transmission apparatus to start supplying power, a name of the second power transmission apparatus, and a second instruction button for instructing the second power transmission apparatus are displayed in the instruction screen; and instructing a power transmission apparatus which is selected by a user on the instruction screen, to supply power wirelessly to the power reception apparatus, wherein if the first instruction button is selected by a user on the instruction screen, instructs the first power transmission apparatus to supply power wirelessly to the power reception apparatus, and if the second instruction button is selected by a user on the instruction screen, instructs the second power transmission apparatus to supply power wirelessly to the power reception apparatus.

3. A non-transitory computer-readable storage medium storing a program that causes a computer to perform a method for controlling a power reception apparatus configured to receive power wirelessly from a power transmission apparatus, the method comprising:

receiving apparatus information of a plurality of power transmission apparatuses including at least a first power transmission apparatus and a second power transmission apparatus;

displaying an instruction screen for instructing a power transmission apparatus to start supplying power, based on the apparatus information received, wherein at least a name of the first power transmission apparatus, a first instruction button for instructing the first power transmission apparatus to start supplying power, a name of the second power transmission apparatus, and a second instruction button for instructing the second power transmission apparatus are displayed in the instruction screen; and instructing a power transmission apparatus which is selected by a user on the instruction screen, to supply power wirelessly to the power reception apparatus, wherein if the first instruction button is selected by a user on the instruction screen, instructs the first power transmission apparatus to supply power wirelessly to the power reception apparatus, and if the second instruction button is selected by a user on the instruction screen, instructs the second power transmission apparatus to supply power wirelessly to the power reception apparatus.

4. The power reception apparatus according to claim 1, wherein information regarding a power supplying capability of the first power transmission apparatus and information regarding a power supplying capability of the second power transmission apparatus are further displayed in the instruction screen.

* * * * *